(12) United States Patent
Salafia

(10) Patent No.: US 9,595,099 B2
(45) Date of Patent: Mar. 14, 2017

(54) AUTOMATED PLACENTAL MEASUREMENT

(71) Applicant: Carolyn M Salafia, Larchmont, NY (US)

(72) Inventor: Carolyn M Salafia, Larchmont, NY (US)

(*) Notice: Subject to any disclaimer, the term of this patent is extended or adjusted under 35 U.S.C. 154(b) by 258 days.

(21) Appl. No.: 14/244,181

(22) Filed: Apr. 3, 2014

(65) Prior Publication Data

US 2016/0035083 A1 Feb. 4, 2016

Related U.S. Application Data

(63) Continuation-in-part of application No. 12/714,088, filed on Feb. 26, 2010, now abandoned.

(51) Int. Cl.
*G06K 9/00* (2006.01)
*G06T 7/00* (2006.01)

(52) U.S. Cl.
CPC .......... *G06T 7/0012* (2013.01); *G06T 7/0081* (2013.01); *G06T 7/0087* (2013.01); *G06T 2207/10024* (2013.01); *G06T 2207/30024* (2013.01); *G06T 2207/30242* (2013.01)

(58) Field of Classification Search
USPC ................................................ 382/128–134
See application file for complete search history.

(56) References Cited

U.S. PATENT DOCUMENTS

| | | | | |
|---|---|---|---|---|
| 5,627,040 A | * | 5/1997 | Bierre ................... | G01N 33/50 382/133 |
| 2009/0290766 A1 | * | 11/2009 | Salafia .................. | G06T 7/0012 382/128 |
| 2010/0220916 A1 | * | 9/2010 | Salafia .................. | G06T 7/0012 382/134 |
| 2010/0291612 A1 | * | 11/2010 | Luider ............. | G01N 33/57407 435/29 |
| 2011/0081056 A1 | * | 4/2011 | Salafia .................. | G06T 7/0012 382/128 |
| 2011/0081059 A1 | * | 4/2011 | Salafia .................. | G06T 7/0012 382/128 |
| 2016/0035083 A1 | * | 2/2016 | Salafia .................. | G06T 7/0012 382/128 |

* cited by examiner

*Primary Examiner* — Alex Liew
(74) *Attorney, Agent, or Firm* — Cranfill Sumner & Hartzog, LLP; Russell Racine

(57) ABSTRACT

A method for analyzing the placenta comprising: selecting one or more placental samples to be analyzed; preparing a histology slide of tissue taken from said placental sample, staining the histology slide using an immunohistochemistry stain, obtaining a digital image of the stained slide; and performing an automated computer analysis on the digital image, wherein the number of trophoblast stromal inclusions is measured.

6 Claims, 11 Drawing Sheets

Neutrophils extracted from the image by the SFCM algorithm

Tissue edema extracted from the image by the SFCM algorithm

Connective tissue extracted from image by SFCM algorithm

| Traced image | Cord dis $r$ | $J$ | $fI$ | Traced image | Cord dis $IL$ | $LI$ | $fJ$ |
|---|---|---|---|---|---|---|---|
|  | 1.89 | 5.16 | 0.74 |  | 4.58 | 5.88 | 0.77 |
|  | 1.13 | 4.97 | 0.74 |  | 4.87 | 5.55 | 0.80 |
|  | 2.77 | 4.13 | 0.75 |  | 4.98 | 8.85 | 0.75 |

3D Scan of the Chorionic Surface

Surface Vasculature extracted from the 3D Chorionic Image

FIG. 10A, 10B, 10C
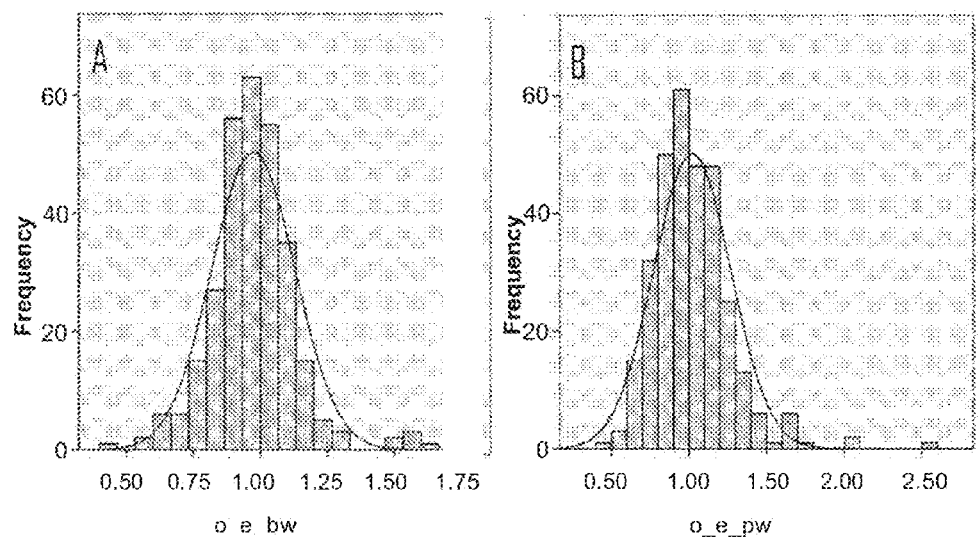
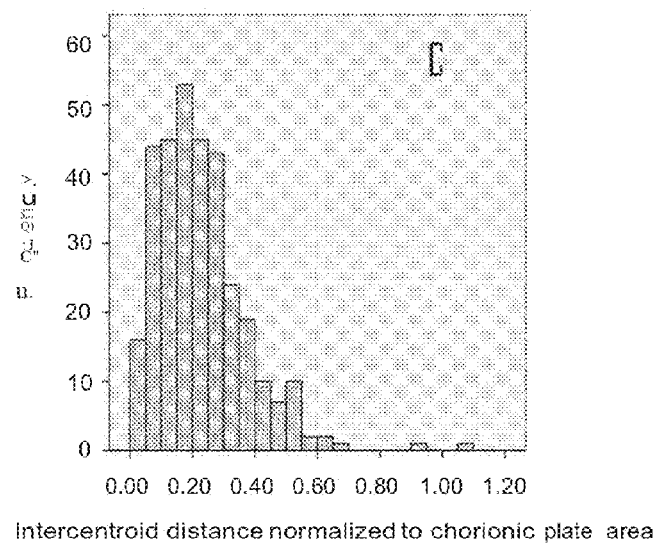
Intercentroid distance normalized to chorionic plate area One of a series of slides from the reconstruction of the villous tree

AUTOMATED PLACENTAL MEASUREMENT

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not Applicable.

REFERENCE TO RELATED APPLICATIONS

This application is a continuation-in-part of U.S. application Ser. No. 12/714,088, filed Feb. 26, 2010, which is a continuation-in-part of U.S. application Ser. No. 12/573,616, filed on Oct. 5, 2009.

FIELD OF THE INVENTION

The present invention generally relates to automated imaging measures of the intrauterine environment through measures of placental imaging and histology.

BACKGROUND

The placenta, the key organ upon which the fetus is entirely dependent for all oxygen and nutrition, grows in a branching fashion analogous to the growth of a tree and its branches. The major villous types, their principal time periods of development during gestation, and their specific physiology have been well delineated in the research setting. But routine pathology slide review has poor reliability in distinguishing the major patterns of placental branching morphogenesis. As the evidence that lifelong health risks appear to be correlated with birthweight, the importance of placental growth and development as the principal non-genetic contributor to fetal growth has grown.

The placenta is the only fetal organ that can be dissected in a living child to yield information related to cell proliferation (a marker of tissue health), branching (reflecting gene transcription events) and cell death.

Placental vascular growth, essential to healthy fetal life, is too complex to be reliably estimated even by specialists. Indeed, pathologists often make unreliable diagnoses of histology features that are recognized to be associated with long term health risks.

A reliable and automated assessment tool performed on routine stained placental slides may help understand how intrauterine stressors modulate placental (and by extension fetal) well-being.

Thus, there exists the need for an automated, reliable, and inexpensive method of measurement of placental vascular growth through placental imaging and histology.

SUMMARY

Disclosed herein is a new approach towards automated measures of the intrauterine environment through placental imaging and histology.

Other objects and features will be in part apparent and in part pointed out hereinafter.

BRIEF DESCRIPTION OF THE DRAWINGS

Those of skill in the art will understand that the drawings, described below, are for illustrative purposes only. The drawings are not intended to limit the scope of the present teachings in any way.

FIG. 10A is a histogram depicting the distribution of baby weight normalized to chorionic plate area.

FIG. 10B is a histogram depicting the distribution of placental weight normalized to chorionic plate area.

FIG. 10C is a histogram depicting the distribution of inter-centroid distance normalized to chorionic plate area.

DETAILED DESCRIPTION OF THE INVENTION

Figure 1:
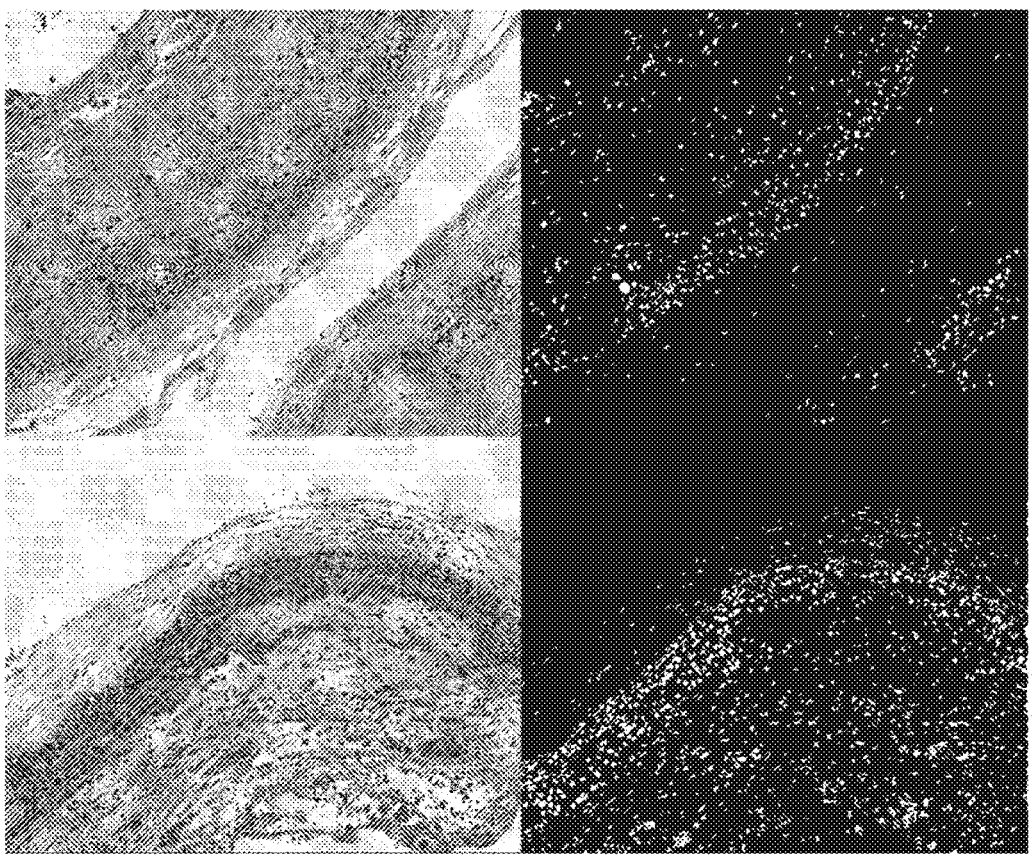
FIG. 1 is a pair of before and after images of placental tissue processed by a spatial fuzzy c-means algorithm (SFCM algorithm). In this application of the algorithm the parts of the image that show the neutrophils have been extracted.

The methods described herein teach a process for extracting medically significant information from digital images of placentas and placental tissues by processing the image through a mathematical algorithm. The medically significant information extracted from the image may, for example, count neutrophils that are responses to bacterial infection. High neutrophil counts indicate a bacterial infection was present in the fetal environment before birth. Such bacterial infections are one of the most significant predictors of risk for Cerebral Palsy (CP) in term infants. Cerebral Palsy is not diagnosed until several years after birth; CP cannot be identified by examination of the mother or the newborn, but identification of the risk of CP by the methods taught herein can enable a physician to prescribe a plan of monitoring and early intervention if signs of the disease begin to manifest themselves. An example of the extraction of neutrophil information is discussed further in Example 1

Another example of medically significant information that can be extracted from digital images is a measure of the integrity of the connective tissue. As a result of bacterial or viral infections, these connective tissues may be damaged by digestive enzymes released by the neutrophils recruited to attack the invader. These same enzymes can damage the connective tissues of the fetus and lead to brain and lung damage in the child. As with CP, this damage may not be observable in the newborn, but the information produced by these methods for analysis of the placenta may allow a physician to prescribe early monitoring, intervention, or treatment for the infant and child. Furthermore, medically significant information can extracted from digital images of placental histological features so as to provide analysis of congenital viral infection (well recognized as a precursor to fetal anomalies as well as poor long-term neurological development), and maternal/uteroplacental and fetal-placental vascular pathologies (both of which are associated with fetal hypoxia and risk for poor long-term neurological development).

Another example of medically significant information is the measurement of placental shape that measures the underlying vascular fractal and is an indirect measure of healthy placental growth throughout pregnancy and indicates times during pregnancy when stressors alter placental (and by extension, fetal) health. Placental shapes can be measured by image segmentation or pixel counting and Fourier analysis.

Another example of medically significant information is the quantitation of chorionic branching structure. The number of chorionic blood vessels, the number of branch points, inter-branching intervals, and the total vascular length are measured to quantify aspects of vascular growth and gene events relevant to fetoplacental branching and growth early and throughout gestation. Segmentation and branching metrics including Laplacian and other graph and network metrics can be used to analyze the 2-dimensional image to quantitate and time the severity and numbers of events contributing to deformation of placental vascular branching growth.

Another example of medically significant information is the fourier analysis of placental shape that indicates the time and severity of deformed placental vascular growth, and quantitates the effect of altered placental shape on placental function through effects on placental scaling Another example of medically significant information is the assessment of villous maturation and potential exposure to hypoxia, congenital viral infection, fetal vascular pathology, and abnormal maternal uteroplacental perfusion. Altered villous size, vascularity, extent and integrity of connective tissue, number, hue and intensity of syncytial and stromal nuclei can be used to measure appropriate placental maturation and also serve as indicators of villous diseases that affect placental function and/or fetal health.

Another example of medically significant information is the 3-dimensional reconstruction of the gross placental shape and its mathematical solution, the inverse of which represents the maternal intrauterine environment. The 3-dimensional shape can be reconstructed directly from a 3-d scanning device. Fourier analysis of placental shape indicates the time and severity of deformed placental vascular growth, and quantitates the effect of altered placental shape on placental function through effects on placental scaling.

Another example of medically significant information is the 3-dimensional reconstruction of the villous stem vascular tree. The 3-dimensional reconstruction may be obtained by mathematical recombination of two or more serial sections. Segmentation or branching algorithms can be used to "prune" or remove the finer villous elements leaving the larger branches for analysis. The number of fetal stem blood vessels, the number of branch points, inter-branching intervals, and the total vascular length are measured to quantify aspects of vascular growth and gene events relevant to fetoplacental branching and growth early and throughout gestation. Segmentation and branching metrics including Laplacian and other graph and network metrics can be used to analyze the 3-dimensional image to quantitate and time the severity and numbers of events contributing to deformation of placental vascular branching growth.

Another medically useful technique is the analysis of individually segmented villi for their maternal/uteroplacental and fetoplacental functions using standard diffusion equations.

Another example of medically significant information is the measurement of the timing of the occurrence of events or stressors that affect the growth and development of the placenta and the fetus. The influence of these events or stressors can manifest themselves in the development and branching of the placental vascular system. These events or stressors cause the vascular system to develop in ways that make it deviate from its nominal fractal scale and different types of deviations from the nominally round shape can indicate an earlier event. Thus, measurements of the placental vasculature or the placental shape using algorithms such as segmentation or branching metrics including Laplacian and other graph and network metrics can reveal information about when during the development of the placenta changes occurred that altered or influenced its development. Also, determination of which blood vessels have been affected can lead to an assessment of timing. For example, the chorionic vessels are developed early in pregnancy, and so events that change their development therefore must have occurred early in pregnancy.

The timing of events that change the development of the placental vasculature are correlated with fetal characteristics that are, in turn, strongly associated with childhood health risks. For example, it is commonly understood by those of typical skill in the art that birth weight is a primary indicator of childhood health risk. As birth weight deviates from the optimum range, the risk of childhood health issues increases. Similarly, it is understood that placental weight is strongly correlated with birth weight, and deviations from that correlation are also associated with childhood health risks. The inventors have discovered that placental vascular branching affects placental efficiency and affect birth weight independently of the placental weight.

Yet another example of medically significant information is the assessment of timing of placental infection. The duration of an infection can be determined by the effects of bacterial and bodily-produced chemicals on many different cell types in the placenta, cord and membranes. One example of effect on infection on these tissues is the infiltration of neutrophils that combat pathogens into the placental tissues. Other cells affected by infection and its related physiology include epithelia, connective tissue and fibroblasts, monocyte/macrophages, and vascular endothelia. For example, segmentation algorithms disclosed herein are useful in extracting the images of neutrophils from the digital image of the placental histology slides. As a further example, mathematical analysis, using algorithms that compute the mean distance of each particle to the placental surface, provide an assessment of time of infection.

The first step of these methods is the selection of the placental sample to be analyzed. Every baby is born with a placenta and the sample may be of the entire placenta (i.e., a digital image) or taken from the placenta, the umbilical cord, or the membranes. The sample may be the entire placenta, the gross placental shape, portions of the placenta, umbilical cord, or membranes, or may be a slice of tissue from any of these fixed to a histology slide. The tissues on the slides may be stained to enhance the color separation of the cell types under investigation. Typical stains include, but are not limited to, hematoxylin and eosin (H&E) stain, hemosiderin stain, Masson Trichrome stain, and any of a number of immunohistochemistry stains. The group of immunohistochemistry stains includes, but is not limited to, HPL (human placental lactogen), HSV (herpes simplex virus), ADENOVIRUS, ACTH (adenocorticotripic hormone), AFP (alpha fetoprotein), RECEPTOR (androgen receptor), ANNEXIN, CD10, CD117, CD123, CD138, CD15, CD163, CD1a, CD2, CD20, CD21, CD23, CD25, CD3, CD30, CD31, CD33, CD34, CD34BM, CD38, CD4, CD43, CD45RA, CD45RO, CD5, CD56, CD57, CD68, CD7, CD79a, CD8, CD99, CDX2, CK7, CMV, E-CAD-HERIN, EGFR (epithelium growth factor receptor), ERG, EMA, EMAPERINEURIOMA, ER (estrogen receptor), FACTOR 8, FSH, GLUT1, hCG, IgG, CD61, CD14, ACTIN, MPO, c-Myc, P53, FLAP, PMS2, PD-1, SMA, TCR, TOXO, VIMENTIN, CKAE1/AE3, CKMIX, CKCAM5.2, and SALL4. The samples may be taken soon after birth, or the placental tissues may be preserved in formalin and the digital images may be taken at a later date, even years later. Measurements taken at birth can be used to predict risk to future pregnancies born to that mother, as well as risks to the particular child.

A digital image of the placental sample may be obtained using a film or digital camera, using a microscope with a camera attachment, or using a slide digitizer. Film images may be digitized if they are of sufficient resolution. For obtaining a digital image of the entire placenta, the preferred method is to use a digital camera. For obtaining a digital image of histology slides, the preferred method is to use a slide digitizer such as an Aperio T3, manufactured by Aperio Technologies Corp. in Vista, Calif. Other slide digitizers may be used such as those manufactured by Nikon, Zeiss, or Leica. The digital images of histology slides should have sufficient resolution to allow extraction of image features up to a magnification of 20-40×.

The digital images are analysed by processing them by a mathematical algorithm. Several types of algorithms may be employed alone or in combination to extract the features of interest from the image. Among the algorithms that can be used are spatial fuzzy c-means algorithms, segmentation algorithms, boundary finding algorithms, counting algorithms, length measuring algorithms, branching algorithms, angle measuring algorithms, and color discriminating algorithms. Other types of algorithms useful for image analysis or segmentation are clustering (K-means) algorithms, mean shift algorithms, histogram-based algorithms, edge detection algorithms, region growing algorithms, level setting algorithms, graph partitioning algorithms, watershed transformation algorithms, model based segmentation algorithms, multiscale segmentation algorithms, semi-automatics segmentation algorithms, and neural network algorithms. Also object based algorithms may be used. In these, the algorithm compared the objects found in the segmented image to reference objects which the algorithm has been given. For example, a branching algorithm may be used to extract the extent of branching of the major placental blood vessels from the digital image of the chorionic surface of the entire placenta. A color discriminating algorithm may be used to extract the neutrophils from a digital image of a histology slide and then a counting algorithm used to count the number of neutrophils present.

These mathematical algorithms analyse the image by the application of mathematical rules. For example, one particularly useful algorithm is the spatial fuzzy c-means (SFCM) algorithm. The unsupervised cluster algorithm, called SFCM (Spatial Fuzzy c-Means), is based on a fuzzy clustering c-means method that searches the best fuzzy partition of the universe assuming that the evaluation of each object with respect to some features is unknown, but knowing that it belongs to circular regions of R 2 space. The spatial function is the summation of the membership function in the neighborhood of each pixel under consideration. The advantages of the SFCM are the following: (1) it yields regions more homogeneous than those of other methods, (2) it reduces the spurious blobs, (3) it removes noisy spots, and (4) it is less sensitive to noise than other techniques. This technique is a powerful method for noisy image segmentation and works for both single and multiple-feature data with spatial information.

The features of interest include neutrophils, connective tissues, portions of edema, cell nuclei, major blood vessels, branched villi, large villi, long villi, small villi, nutrition exchange vessels, and capillaries, markers of fetal hypoxia such as syncytial knots and syncytial basophilia, villous fibrosis/scarring, chronic villitis and chronic intervillositis, infarcts, abruption, perivillous fibrin deposition and cytotrophoblast proliferation, abnormalities of clotting and inflammation in the basal plate and maternal uteroplacental vessels, cell death of epithelia, stroma, endothelia, proliferation of macrophages and fibroblasts in connective tissue and stroma, trophoblast stromal inclusions, abnormalities of clotting and inflammation in the fetal-placental blood vessels.

After extracting the feature of interest from the digital image measurements of those features may be made and statistics of those parameters may be calculated. In one example noted above the neutrophils can be extracted and then counted. Similarly, syncytial knots may also be extracted and counted. The major blood vessels may be extracted and their lengths and areas measured with statistics such as minimum, maximum, and mean computed.

Obtaining the digital image, analyzing the image, extracting the features of interest, applying the algorithm or algorithms, and computing relevant statistics may be automated by computer scripts or macros. The physician or pathologist may be able to insert a slide in a slide digitizer and via an interface select features of interest or regions of interest on the image and the computer scripts will perform the requested analysis and report the relevant measurements or statistics in an automated operation. It is contemplated within the scope of this invention that these scripts may allow a slide to be inserted into the slide digitizer and the computer will look for any evidence of abnormality or disease in a completely automated operation without prior physician input.

Statistics derived from the digital image are correlated with known health risks and outcomes. High numbers of neutrophils are known to be related to risk of Cerebral Palsy. Vascular edema is related to brain damage. Lack of integrity of connective tissue is related brain, lung, and heart damage. Additional published studies relate the health and development of the fetus, as reflected by changes in birth weight that are independent of parental or extrauterine factors, to the long term health—or health risks—of children and adults. The placenta, as the fetus' sole source of oxygen and nutrients, is the principal determinant of fetal growth independent of factors such as parental size and reflects the adequacy of the maternal environment.

Reliable measures of placental tissues as taught by the methods described herein enable physicians to more accurately assess future health risks, risks to future pregnancies of that mother, and to prescribe monitoring, intervention, and treatment at an earlier time and to greater effect of her current child. Thus is provided an approach for an automated and method of placental diagnosis that includes a completely novel measurement of placental vascular branching structure and more comprehensive and reliable histopathology diagnoses that can be performed on a routine hematoxylin and eosin stained slide obtained from, for example, the placenta at birth. Other stains such as hemosiderin stain, Masson Trichrome stain, and any of a number of immunohistochemistry stains can also be used. The immunohistochemistry stains include, but are not limited to, CK516, CK7, CK8, CK20, CKAE1/AE3, CKMIX, CKCAM5.2. This measure can improve diagnosis of fetal growth restriction, identify critical periods of abnormal placental growth that might mark risks for later health risks, and reliably diagnose placental histopathology features that have been associated with increased long term neurodevelopment risks but which remain unreliably diagnosed by routine pathology. The measure is comprehensive, including both measures of the whole placenta and visible features of the chorionic surface vasculature with measures of the fine (microscopic) placental structure. Further, the measurement is automated, incorporating into its algorithms the full field of knowledge of placental structure, pathology, and functional correlates. The reliability of the method and the ease of preparation of a routine stained slide, makes its application practical on a wide population basis. As such, the diagnoses generated by these measurement tools would be accessible to all newborns. Such tools could impact public health burdens as obesity and diabetes, cardiovascular disease, certain cancers, and psychological disorders, disorders that have their genesis, at least in part, in fetal life.

The growth of the placental villous tree is driven by and depends directly upon fetotplacental angiogenesis throughout gestation. Placental villous and vascular maldevelopment is a well recognized correlate to both maternal and fetal complications of pregnancy, consistent with evidence that the mother and the fetus provide complementary cell signals that impact the structure of the mature fetoplacental vascular tree. There is also evidence that this cooperative effort may be gender-dimorphic and also that such increasingly common maternal features such as obesity impact angiogenic patterns within the fetoplacental unit, as measured in the placenta. Thus the placenta is a fetal organ which has a mature structure of a branched epithelial (villous trophoblast) tree which shares conserved mechanisms of developmental branching morphogenesis with other fetal epithelia. The placental branched epithelial tree is dependent upon the underlying placental angioarchitecture. Inflammation is the classic example of processes that affect angiogenesis. Prenatal exposures to inflammation impacts the fetus and the placenta, positioned at the interface of the maternal and fetal environment. While fetal patterns of branched morphogenesis and mature angioarchitecture cannot be measured in detail in the living child, effects on placental villous branching growth can be identified and quantified as villous maldevelopment (VMD). Without wishing to be bound by a particular theory, the inventor believes that this potential effect of inflammation may be a critical step in the pathway by which inflammation exerts its adverse effects on both the fetus and the placenta, since VMD may reflect the same processes operating in the brain neural network exposed to inflammation.

As the best mode, object based algorithms such as Definiens image analysis software have been used in conjunction with immunohistochemical (INC) staining such as cytokeratin 7 (CK7) to develop an automated assessment of placental villous sizes and shapes and surface irregularity. CK-7 recognizes the CK isoform expressed by the placental epithelium, the trophoblast. Our algorithm automatically detects each villus in a given slide, and subdivides them into specific sizes and shape features, including ellipsivity, Y-configurations that indicate site of branching and surface irregularities defined as tortuosity (length of CK-7 positivity/actual length and, where applicable, detects the trophoblast epithelial invaginations (also termed "trophoblast stromal inclusions", or "TSIs".

Tissue samples were selected for IHC stains by pathologists. Antigen rescue (boiling in 0.1 mM citric acid) and IHC (a standard immunoperoxidase-DAB protocol) were done with a 360 IHC Autostainer (Thermo Fisher, Scientific Kalamazoo, Mich.). A number of inflammatory markers have been mapped in formalin fixed placental tissue; we have matched reagents including the detecting antibodies with the published literature. The routine and IHC slides were digitized using an Aperio XT. IHC stained slides were digitized and analyzed automatically using a custom made application based on Definiens image analysis software. The application automatically detects each villus in a given slide, and subdivides them into lumen and surrounding trophoblast membrane. Where applicable, it detects indentations, or irregularities in the villous outline that measure VMD as well as villus surface irregularities, i.e. TSIs. Furthermore, structural analysis of each villus yields descriptors like number of indentations (quantifying surface regularity), presence and number of TSI, asymmetry, branching, and length. Statistics of these descriptors across well-defined fields of view or full slides were used to find those descriptors that have the greatest predictive value with regards to ASD diagnosis compared to controls. Definiens is a significant improvement over standard image analysis approaches which are based on thresholding to determine segment boundaries but contain no information about the spatial relationships amongst pixels. Each pixel is assigned cluster membership independent of its position relative to others. This clearly ignores information that can aid in building higher quality segmentation results. Object based algorithms such as Definiens allows the definition of image objects, which can be identified at a given magnification and carry across into analysis made at other magnifications. Quantities extracted from IHC staining for immune cell phenotype and/or cytokine immunolocalization are expressed as positive pixels divided by the total number of tissue pixels. Quantities extracted from cytokeratin-7 staining to mark villus structures and the regularity of the trophoblast outline are expressed as the number of discrete objects outlined, and as their distributions of size. We also extract shape measures, ranging from simple ellipsivity to more complex quantitation of branched shapes and the shape of the villous surfaces quantified as the length of IHC positivity per length of villus. Extreme surface irregularity is evaluated by the presence of a trophoblast invagination into the villous stroma. The automated algorithms annotate and evaluate the entire digitized slide, guaranteeing that that no field is evaluated twice, and that pathologists review the exact same regions of IHC positivity or specific feature.

To date, we have matched 34 children with ASD (29 males and 5 females) to 124 controls based on gender, birthweight (BW) and gestational age (GA). There was no difference in mean BW, GA, placental weight or the ratio of birth to placental weight. However, disk thickness differed significantly, with ASD placentas 10% thinner on average (2.56+0.44 v 2.81+0.54, p=0.015). Acute and chronic inflammation of the placenta were each more common in ASD cases (0.01>p<0.05). Chronic placental inflammation was associated with reduced disk thickness at the p=0.05 level. In this sample, we demonstrate that prenatal exposures of acute inflammation, chromic inflammation, or both as identified in routine H&E stained histology samples is associated with ASD diagnosis. Fetal inflammatory response was increased in ASD despite a lack of association of ASD with maternal fever. Thus, these cases of prenatal exposure to acute inflammation were at least partially clinically silent with regard to a standard marker of infection. In these cases, VMD is obserbved by reduced disk thickness (highly correlated with reduced villous branching growth) without a change in placental weight. This implies a difference in placental villous "composition". Chronic inflammation is both associated with ASD diagnosis and is correlated with altered disk thickness, consistent with the mechanism that prenatal inflammation affects VMD in the context of ASD.

Histopathology Slides

Referring to FIG. 1 the SFCM algorithm is set to segment the image based on the color value, intensity, and hue and the size and eccentricity of the pixel grouping it detects. These parameters have been to optimize the segmentation of neutrophils from the other cells in the image on an H&E stained slide. Other stains are used to optimize the segmentation of other cell types and therefore require modification of the segmentation parameters of the SFCM algorithm. In one example the parameters of the SFCM algorithm are modified to maximize the high intensity in the blue channel when hemosiderin stains are used to distinguish fetal or maternal bleeding in fetal or maternal tissues. In another example the SFCM algorithm is adjusted to maximize segmentation of the bright blues and reds produced by the Masson Trichrome stain. That stain is used to evaluate connective tissue issues in muscle (red) and collagen (blue), or to differentiate cell nuclei (dark brown/black) from cytoplasm (pink). In another example, immunohistochemistry stains target specific antigens turning them brown against a blue background. The parameters of the SFCM algorithm are likewise modified to enhance the segmentation of these cells from the background.

As with the case in the visual analysis of neutrophil counts the reliability and repeatability of these non-automated measurements is very poor. Automating these measurement by the analysis of digital images of histology slides using these algorithms greatly improves the reliability and repeatability of measurements and benefits patients by having more accurate and reliable diagnoses. The Masson Trichrome stain is used to diagnose villous fibrosis (scarring) and indicate abnormal placental growth. It also distinguishes muscle tissue from collagen and helps to diagnose cirrohosis, liver and kidney issues, and tumors. Immunohistochemistry stains indicate cytokines, inflammation, cell growth/death signals, fenotypic induction, cell cycles, and gene markers. These stains lead to diagnoses of tumors, autoimmune diseases, infections, atherosclerosis, and other aging disorders.

Image Analysis: Gross Placental Features

Image segmentation methods are described herein to be applied to the gross features of the placenta and to histology slides taken from placental tissues. The prior art method for measuring the whole placenta involves describing whether the placenta is round/oval or more irregular, noting whether more than one placental lobe is present, and taking a single measurement of larger and smaller diameters, and a single measure of the placental disc thickness. This method may be used in capturing the shape of regular, round/oval placentas, but is unreliable in regards to the irregular placental shapes that are commonly considered to reflect the effects of the most problematic maternal/uteroplacental environments and the formations of normal placental growth patterns. We have demonstrated, using the publicly available data collected as part of the Collaborative Perinatal Project, that abnormal placental shape has a persistent negative effect on birthweight after adjustment for placental weight and other placental dimensions. Thus, given to placentas, each weighing 500 g, the placenta with the irregular shape will yield a statistically significantly smaller baby than a round/oval placenta. This means that abnormal placental shape is not compensated for by further placental growth. Furthermore, abnormal placental growth affects the three-quarter scaling of placental growth to fetal growth, indicating that these abnormal shapes reflect abnormal placental vascular fractal networks. While most normal placentas (placentas delivered with infants who are well grown at term and not admitted to the neonatal intensive care unit) will have a uniform thickness, many placentas have variable thickness which is well recognized to reflect variable arborization of the placental villous trees. It is generally held that such variability in villous arborization reflects maternal uteroplacental pathology. However, current surgical diagnostic methods do not capture variability in disc thickness, and current research methods cannot allow such variability to be analyzed.

We described that more precise measurement of placental perimeters increases the total amount of birthweight variants attributable to placental factors. However, this measurement method required a trained technician applying costly software, and could not be used on a population basis. Our current methods involved the simple tracing of the placental perimeter, noting appropriate landmarks (such as umbilical cord insertion and the edge of the placenta closest to the free edge of the ruptured membranes) with a drawing tool in Adobe Photoshop. Use-specific algorithms written in MatLab code extract a series of quantities that reflect the area, eccentricity, and regularity of the shape. We have applied the same method to marking the vascular parameter of the chorionic disc, to furthest-most extensions of the chorionic surface vessels on the plate. A similar use-specific algorithm calculates a series of quantities, and the two sets of quantities are used to calculate the eccentricities, among other features, of the two shapes.

Umbilical Cord Centrality

The current art for measuring the insertion, or connection point, of the umbilical cord into the chorionic surface of the placenta, is to measure the distance from the edge of the umbilical cord insertion to the nearest edge of the placenta. The selection of the nearest edge point is done by eye, and the measurement is taken to the nearest centimeter.

The inventor has discovered that the location of the insertion of the umbilical cord is an important indicator of abnormal growth and development of the placenta, and, in turn, the potential for abnormal growth and development of the fetus. The inventor believes, without wishing to be bound to a particular theory, that this surprising discovery may be due to the development of the fractal growth of the system of blood vessels in the placenta. An umbilical cord insertion that deviates from the geometric center of the placenta (regardless of the shape of the placenta) reflects the result of abnormal force or forces acting on the fractal growth of the placenta, deforming the fractal. The deformation of the fractal growth leads to abnormal growth and development of the placenta which causes it to be less than optimal in structure and less than optimal in its function of delivering oxygen and nutrients to the fetus.

The current art for measuring the insertion, or connection point, of the umbilical cord into the chorionic surface of the placenta, is to measure the distance from the edge of the umbilical cord insertion to the nearest edge of the placenta. The selection of the nearest edge point is done by eye, and the measurement is taken to the nearest centimeter. This measurement is inadequate in many ways. Placentas may be circular, elliptical, multi-lobed or irregular in overall shape. A measurement to the nearest edge does not reveal where on the surface the umbilical insertion actually is, nor does it reveal the location of the insertion point with regard to the placenta's geometric center.

The inventor has discovered that these difficulties can be overcome by the automated analysis of digital images of the placental chorionic surface using one of a group of mathematical algorithms. One example of a mathematical algorithm is the use of Fourier analysis of the radial distances from the umbilical cord insertion point to a point on the placental perimeter as the computer sweeps around the perimeter, analyses the deviation of the umbilical cord insertion point from the calculated geometric center. Another example of a mathematical algorithm is the computer measurement of the radial distances from the umbilical cord insertion point to a point on the placental perimeter as the computer sweeps around the perimeter. The radial distances are plotted as a function of the sweep angle theta, and the first and second derivates of the function are computed.

A measure of the centrality of the cord using a Fourier analysis is obtained as follows. First, the umbilical insertion point is placed at the origin. Perimeter markers are connected by straight line segments to obtain an approximate perimeter P of the chorionic plate. A sector of opening of 6 o with vertex at the origin is rotated in 6 o increments. For each turn of the sector, the points in P inside of it are averaged to yield a radial marker. In this way, we obtain 60 radii emanating from the origin spaced at 6 o intervals. They are connected to obtain the angular radius r(0), which is a function of the angle 0 from the umbilical insertion point. The function r(0) can be analyzed using the standard techniques of Fourier series. In particular, we computed the first Fourier coefficient of r(e).

The first Fourier coefficient, ICI, can be used as a measure of the centrality of the umbilical cord. It measures the "average oscillation" of the placental radius in one full turn around the umbilical insertion point.

Cord centrality significantly impacts placental efficiency: non-central cord insertion for the same placental weight results in a smaller baby. We note first, that placentas with larger value of the cord displacement tend to be larger in size. The value of the cord displacement found from analysis of photographs taken from a birth cohort collected by the University of North Carolina was correlated with the mean placental radius (correlation 0.046) and with the placental weight (correlation 0.164). To determine if the placentas with a large cord displacement were as metabolically efficient as the normal ones, we have calculated the correlation of cord displacement with the scaling exponent:

$$\beta = \log(\text{Placental Weight})/\log(\text{Birth Weight}).$$

Figure 4:
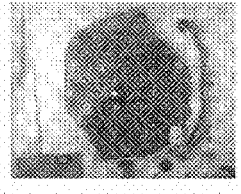
FIG. 4 is a group of six digital images of placentas that have been analyzed and the umbilical cord centrality measured.
Figure 4:
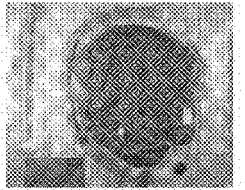
Figure 4:
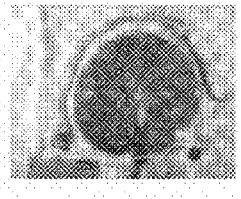
Figure 4:
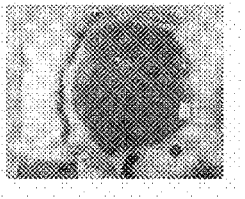
Figure 4:
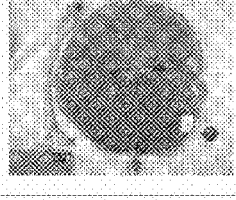
Figure 4:
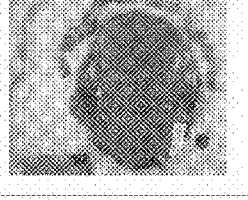

It is large (0.158) and very significant (0.000). When we use the size of the first Fourier coefficient ICI as the measure of the cord displacement, the correlation with $\beta$ is even larger (correlation 0.2, significance 0.000). Thus, the placentas with a large umbilical cord displacement, measured either as a distance from the geometric center, or as ICI, are less metabolically efficient (FIG. 4). Even though these placentas grow larger than normal, the added placental weight does not translate into the corresponding gain for the birth weight. Placentas with a non-centrally inserted cord tend to produce smaller babies than normal placentas of the same weight.

Thus, non-central insertion of the umbilical cord is a source of deformation of the macroscopic placental architecture. This is somewhat unexpected, as the shape of a placenta with a non-central insertion can still be round, as confirmed both by our statistical analysis, and by the dynamical models of placental growth. Even if typically a placenta with a non-central insertion is of a normal round shape, its surface vascular distribution is sparse and, as reflected by a larger $\beta$, is less metabolically effective. This results in a smaller birth weight for the same placental weight.

The altered structure of the surface vasculature can be seen from measurements of the coverage of the placental surface with the large branches of the vascular tree. The placentas with a non-centrally inserted cord suffer from a sparser vascular coverage, so that a point on the surface is typically further away from a large blood vessel than in a normal placenta. But the easiest-to-grasp indicator of the deformation of the placental vascular architecture as a whole (both macroscopic and microscopic finer structure of placental stem and terminal villi) is the metabolic scaling exponent $\beta$ calculated as the ratio of the logarithms of the placental weight and the baby birth weight. The quantity $1/\beta$ should be seen as a biologically relevant version of the fractal dimension of placental vasculature, so the larger value of $\beta$ implies a poorer placental functional efficiency and an altered placental vascular fractal. We observe that the value of $\beta$ is strongly and significantly correlated with non-centrality of the cord insertion. Placentas with a non-centrally inserted umbilical cord are typically larger both in diameter and by weight. Without wishing to be bound to a particular theory, we speculate that the larger size is a compensatory mechanism for a reduced efficiency per unit of placental weight.

Placental Thickness

The Pregnancy, Infection and Nutrition Study, a prospective birth cohort recruited between 2001 and 2005, was used in a study of placental thickness and its effects of birthweight. All consented placentas were processed including gross photographs of fetal surface and sliced placenta. 644 cases had slice photos from which repeated measures of disk thickness could be made by marking x,y coordinates across the length of a placental slice using a Kurta graphics tablet. The thicknesses can also be measured from a 3-D scan of the placenta or the central placental slice can be used. From the pairs of x,y coordinates, thickness values for each slice (minimum, maximum, mean and standard deviation) were taken and averaged across each placenta. In addition, thickness at the centroid could be measured. Regression considered p<0.05 significant.

The greater the maximum thickness of the placenta, the less birthweight after adjustment for gestational age and placental weight (b=−46.7+1−21 g, p=0.027). However, when we stratified at the median of the average maximum thickness, the effect of thickness on adjusted birth weight was positive in the range less than the median (40.59) and negative in the range greater than the median (−38.34).

Increased disk thickness generally results in a smaller birthweight for a given placental weight, but when placentas are overall thin, the effect of thickness is to increase birthweight, while when the placentas are overall thick, even thicker area reduce birthweight. Maximum thickness is shown to be the single strongest influence on birthweight for a given placental weight, but both maximum and minimum disk thickness contribute to the overall effect of variable disk thickness on birthweight for a given placental weight. The different relationships between thicker areas and overall thinner and thicker placentas indicate how placental growth translates—successfully or not—into adequate birthweight.

3D Reconstruction of the Placental Shape

Currently, the most common measurement of the placenta is its weight, which has been shown to correlate with infant and childhood health risks. Crude measurements of placental surface dimension (usually a largest and smallest diameter) are also routinely made. Measurements of the volume are not routine, but can be made by water displacement. None of these, however, reveal the 3-dimensional shape of the placenta, which is an important indicator of the development of the fine vascular structure. Placentas have been sliced through their depth into four or more pieces to obtain an estimate of the 3-dimensional structure, but a need exists to reconstruct the entire 3-D shape.

Figure 5:
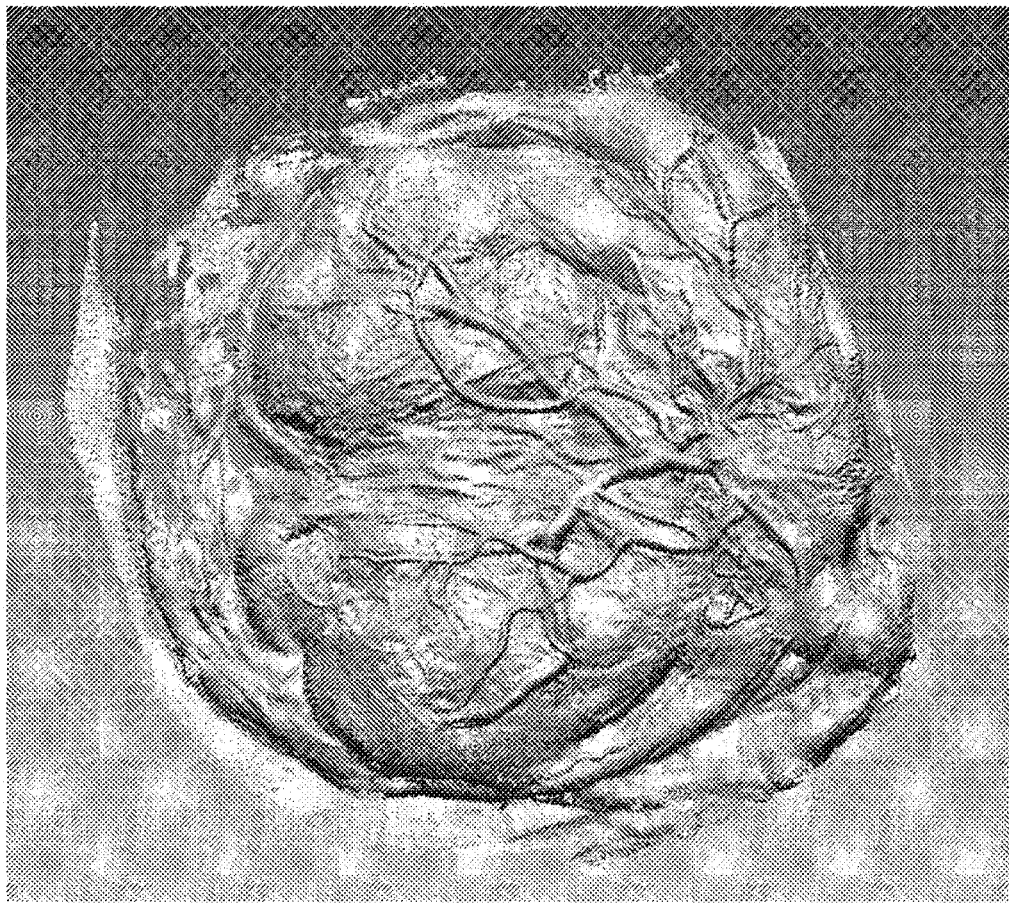
FIG. 5 is a 3 dimensional reconstruction of the chorionic surface.

The inventor has discovered that the 3-D shape can be reconstructed by using a 3-D scanner. The placental disc can be scanned as delivered or after being fixed in formalin. The scanner can use visible light or can use laser light to obtain the image. Suitable scanners include the #D Scanner HD manufactured by Next Engine, Santa Monica, Calif., the LC6OD Laser Scanner manufactured by Nikon Metrology, Brighton, Mich., the Mephisto manufactured by Thing Lab, Londaon, UK, the ZScanner 600 manufactured by Z Corp, Burlington, Mass., and the 3-D Scanner manufactured by Connecticut Center for Advanced Technology, East Hartford, Conn. FIG. 5 is an example of a 3-D reconstruction of the chorionic surface.

In order to capture the full 3 dimensional shape the placenta is scanned from two or more angles and then turned over and scanner again from two or more angles. The 3-D image is reconstructed by merging the multiple images to form the reconstructed shape. Markers, such as pins placed in the edge, can improve the registration of the merged images.

Medically significant information can be derived from the reconstructed 3-D shape. The placental volume, thickness at any virtual cross-section, thickness at any radial distance from the umbilical cord or placental centroid, minimum and maximum thickness, placental perimeter, surface area, and segmented chorionic surface vascular branching are all non-limiting examples of medically significant information that can be derived from the reconstructed 3-D image.

Chorionic Surface Vascular Branching

Chorionic surface vascular branching is laid down by the middle of the second trimester, and the principal branches off the umbilical cord insertion reflect the state of the primordial placenta shortly after the onset of the beating fetal heart. As such, the number of such vessels, the number of branch points, inter-branching intervals, and the total vascular length are measured to quantify aspects of endothelial proliferation and gene events relevant to placental branching early in gestation. At the same to early gestational ages, fetal viscera such as lung, kidney, and pancreas are also using the same gene families, and the same molecular signals and cascades to induce growth and branching growth.

Segmentation of the Surface Vasculature from the 3-D Reconstruction

Figure 6:
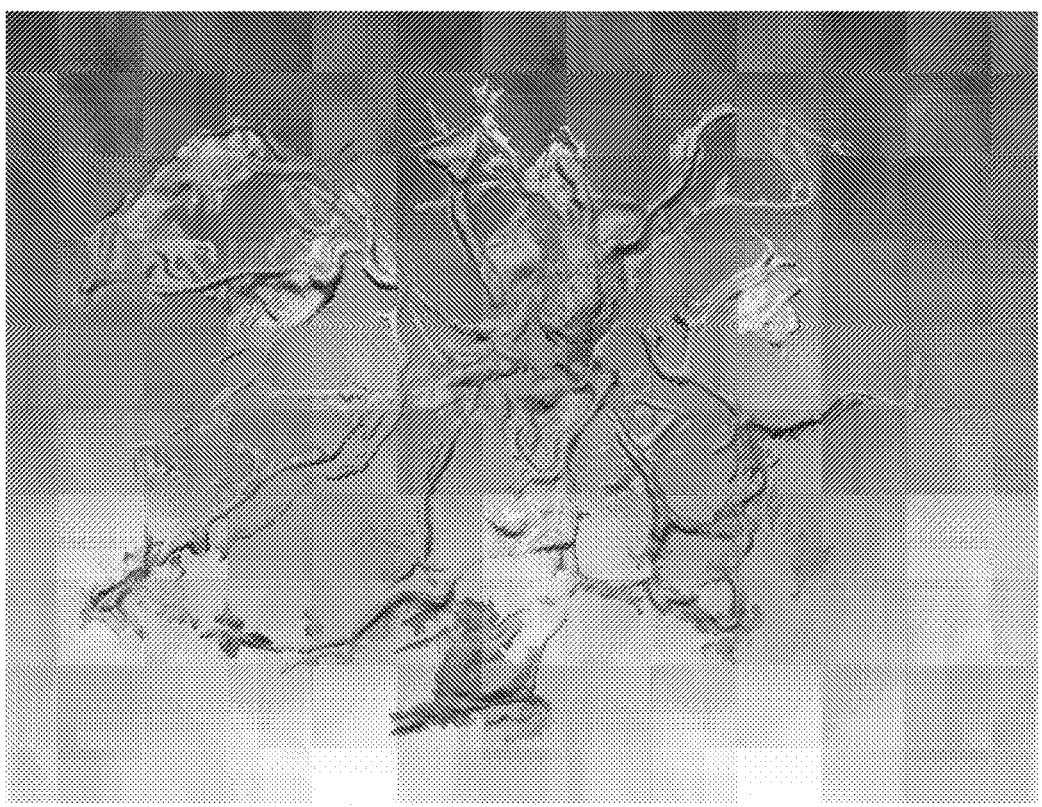
FIG. 6 is an image of the chorionic vasculature extracted from the 3D chorionic surface reconstruction.

The surface vasculature can be segmented from the reconstructed image by means of the radius of curvature of the vessels in comparison to the rest of the chorionic surface. It is also possible to distinguish arteries from veins on the surface and use them to trace the locations of the placental functional units. FIG. 6 is an example of the segmentation of the surface vasculature.

Image Segmentation: Histologic Placental Features—Current Diagnostic Types (Acute Inflammation, Chronic Inflammation and Vascular Pathology)

While histopathologic identification of specific features is the prior art method for diagnosis of inflammation and hypoxia, the diagnosis of these processes, each with well-characterized fetal, neonatal and potentially lifelong impacts, remains problematic. Interobseiver reliability, even with a test set of 20 slides, 14 of which had lesions, yielded reliability coefficients that were primarily only "fair". Furthermore, "consensus" was the gold standard, not a specific maternal, fetal or neonatal outcome, nor was an objective morphometric quantification provided for such items as "neutrophil count" or "syncytial knotting". The digitization of images and, more recently, entire histology slides, has moved each of these into the realm of "data", accessible (as pixels) to mathematical manipulation.

Stained histology slides of placental tissue produce images with highly concentrated color spectra, making these images strong candidates for the use of automatic image segmentation and object classification algorithms.

Image Segmentation: Villous Branching Structure

While at least some methods for histopathologic identification of inflammation and hypoxia exist, the prior art has no standard method for the analysis of placental branching architecture. Advanced mathematical techniques are well suited for the quantitative analysis of placental branching architecture, and the quantities so extracted can be entered into models to study their contributions to causal pathways of fetal disease. However, placental arborized structure, as measured after delivery, reflects the effects of the underlying maternal uteroplacental environment. That environment is not directly observable (hence "latent") but it causes the observed placental arborized structure. Empirically, then, measures of placental arborized structure and the maternal uteroplacental environment should be correlated, and the relationships among a set(s) of measured histological parameters related to placental arborized structure can be examined. Examples of histological parameters include, but are not limited to, villous numbers, villous areas, villous perimeters, trophoblast features including thickness, vascular features including medial characteristics, luminal perimeter and location within the villus (central versus subjacent to the trophoblast epithelium).

Further examples of histological parameters include, but are not limited to, syncytial knots (e.g., dark blue cluster of round objects); perivillious fibrin/fibrinoid (e.g., pink and devoid of nuclei the size of normal villous Syncytiotrophoblast, stroma and endothelial cells); cytotrophoblast proliferation (useful, for example, to distinguish "old" PVF from recent PVF; e.g., nuclei of the size of cytotrophoblast cells which should be distinct from villous stromal and other nuclei, found in PVF); and stromal cellularity (e.g., nuclear number within each distinct villus or maybe better nuclear area per villous area). Such histopathology parameters can be detected in, for example, H&E slides. Still further examples of histological parameters include, but are not limited to, syncytiotrophoblast; endothelium (useful, for example, to verify H&E stained algorithms); macrophages (e.g., 40-60% of villous stromal cells are immunocompetent macrophages); and anchoring and endovascular trophoblast (useful, for example, to shifts focus from villous arborization to the placental remodeling of the implantation site, which moves analysis into earlier times of gestation, and ultrasonographic correlation). Such histopathology parameters can be detected in, for example, immunohistochemical (IHC) stained or in situ PCR slides for cell proliferation, cell activation, cell death and gene expression.

The methods described herein can be employed to reliably diagnose placental villous branching patterns that, to date, cannot be reliably diagnosed including, but not limited to, the 6 paradigm branching patterns as elaborated by Kaufmann (Normal preterm placenta (defined as prevalence of immature intermediate and mesenchymal complete absence of mature intermediate and terminal villi, poorly matured stem villi), Immature placenta at term (defined as prevalence of mature intermediate and stem villi, paucity of immature intermediate and terminal villi), Normal term placenta (defined as a generally even distribution of all types of villi), Preterm preeclampsia (the pathology classic for maternal vascular pathology, defined as poorly branched, extremely tiny, filiform terminal villi and because of paucity of terminal branching, an unusually wide intervillous space), Term preeclampsia (defined as a generally even distribution of all types of villi, with terminal villi generally being enlarged and highly branched), and two cases of malformed villi with normal numerical mixture of villous types).

The methods described herein can also be employed, for example, to: diagnose time of onset of placental pathology (through "branching tree" analysis); quantify the effect of abnormal placental growth on the fetus; reliably diagnose fetal growth restriction including abnormal growth within the "normal" birth weight range; diagnose which cases of maternal diseases (such as diabetes, preeclampsia) affect the growth of the placenta and/or growth of the baby and which do not; document treatment efficacy and treatment failure in patients treated in a subsequent pregnancy after a pregnancy loss or serious complication; and diagnose which pregnancies following IVF/ART have abnormal placental growth and which do not.

Abnormal placental branching could be associated with childhood (and potentially lifelong) abnormal function of organs that are undergoing branching growth at the same time as the placenta. Thus, the methods described herein can also be employed to diagnose risk for abnormal neurodevelopmental outcome (analysis of neuron branching growth); risk of insulin resistance and abnormal glucose metabolism, obesity and diabetes (analysis of pancreatic branching growth); hypertension (analysis of branching growth of the cardiovascular system), reduced renal reserve/ risk of hypertension, renal dysfunction (analysis of kidney branching growth).

Furthermore, by building language algorithms for identifying pathology lesions that are currently recognized correlates with maternal and fetal/neonatal pathologies, one can provide an automated and reliable diagnostic service to a field with few dedicated practitioners and with a large need for such services (e.g., community hospitals, academic centers without a dedicated practitioner, in medicolegal field/risk management with "competing experts") such as histology features that diagnose, for example, acute intraamniotic infections, chronic placental inflammation, maternal utero-placental vascular pathology and fetal-placental vascular pathology. Thus is provided methods to diagnose the mechanistic cause and the time of onset of pathologies that create ill newborns or stillborn fetuses. More generally, the methods described herein allow identification of the time of onset of the histology features described herein and quantify their total effect on the fetus (via their effects on placental growth globally).

Registration and Reconstruction of Branching Architecture

Histology slides are two-dimensional slices from a three-dimensional placental volume. Image registration is the process of transforming the different sets of data into one coordinate system. Registration is necessary in order to be able to compare or integrate the data obtained from different measurements. Using image registration many slices can be combined to form a sub-volume of the threedimensional structure. Two powerful registration methods can be combined in placental registration: Area based image registration algorithms and related methodology look at the structure of the image via correlation metrics, Fourier properties and other means of structural analysis; feature based methods, instead of looking at the overall structure of images, map to image features: lines, curves, points, line intersections, boundaries, etc. Combining segmentation techniques with registration, parts of the villous tree internal to the placental volume may be extracted and studied. Using these methods to segment histology images as well as images of the chorionic surface produces the geometric structure of several parts of the placental villous tree.

Very simple morphological methods can be applied to skeletonize the geometry and construct a representation of the tree as an embedded (i.e. geometric) graph. Graph theoretic techniques are applicable to analyzing the anatomical structure of the villous tree. Metrics can be designed from both the geometry and topology of the villous tree. For example, topological metrics count how many leaves are on each tree or how many levels of branching there are at each leaf, while geometric metrics examine how far traveling between two points in the tree compares to traveling in a straight line across the chorionic plate. Additionally, combined metrics, i.e., metrics that consider both the geometry and topology of the tree, can be used. One example is to measure the length between branch points at each level of branching. During the skeletonization process, some information may be lost (such as the thickness of the vessels), but some of this information can be retained by assigning weights to the edges of the constructed graph and viewing the resulting structure as a flow network or as a self-organizing map, a method that has been useful in dimension reduction.

Validation of Placental Measures and Models: Placental Function Depends on Placental Architecture.

Another embodiment described herein are based at least in part upon application of the discovery that placental growth scales to fetal growth to the three-quarter power, essentially consistent with scaling typical of fractal transport networks, and that altered placental shapes have scaling factors that deviate from the three-quarter rule, consistent with altered placental shapes reflecting altered underlying placental vascular fractal networks.

Modeling placental function and growth are accomplished separately. As stated above the primary function of the placenta is maternal-fetal transfer, therefore models of the vascular tree can be produced that optimize the transport function. Data analysis tools are then applied to compare specific villous trees with trees generated by this model to determine how far the given placental tree is from the "optimal" tree.

Optimal transport can be used to validate our measurement methods; in other words, the villous (and by extension, the underlying vascular) architectures we reconstruct are directly related to the estimated transport function of the placenta. Diffusion limited aggregation (DLA) is a stochastic process that can be applied to dynamically model angiogenesis in the placenta, thereby modeling placental growth. DLA has been used to model retinal and tumor angiogenesis. Dynamic models of placental growth can be used to investigate the effect that environmental changes at different stages of the growth cycle have on the resulting vascular structure. DLA may be particular useful in maintaining a reasonably good agreement between the observed scaling exponent, approximately 0.75, which we have found to be appropriate for describing the relationship between placental structure and placental function.

Dynamical modeling of vascular trees is a new technique, developed by M. Yampolsky and his team at the University of Toronto. There have been prior art efforts to model the complex architecture of a vascular tree. They have been based on selecting certain geometric constraints for the tree, such as the number of branches at each vertex, and the branching ratios; and then optimizing the tree to fill the spatial shape of the organ. This approach is static in its nature, and does not give clues to the temporal development of the vasculature, and thus is not suitable for determining how growth pathologies affect the development of a placental vascular tree and the geometric shape of the placenta. The dynamical growth process in this invention is based on sprouting angiogenesis which is the mechanism of growth at the tips of the vessels. With each time increment, the model vascular tree is randomly grown at one of its extremities, with a single parameter controlling the density of the branching. This random growth process is known as DLA. Applying a "hit" to the parameter of the model at a specific moment of time we influence the development of a particular level of the vasculature.

The model successfully reproduces the variability of shapes of pathological placentas. Quantitatively, the deformations in the model trees will be described by the changes in the average number, length, and thickness of branches. This makes it possible to introduce measures of the deviation from the normal, and to search for markers corresponding to the specific changes in the vascular structure. Another approach to measuring the deviation from the normal relies on measuring the optimality of the branching architecture. Possible conditions of optimality reflect the efficiency with which the blood flow is delivered to the tissues. They translate into an optimal local geometry of the vascular tree. Under the assumption that a normal vasculature is close to optimal, the deviation from normal growth can be expected to induce a measurable decrease in optimality.

In summary, the tools we apply to placental measurement fully characterize the histopathology and the architecture of a fetal organ the growth of which depends upon pathways critical to the genesis of autism and other childhood and adult morbidity risks. Finally optimal transport analysis and DLA confirm that our measures and reconstructions are valid and relevant to placental function and fetal-placental physiology.

Data Reduction

Computer-assisted image analysis minimizes measurement error of individual histology items and while each item may be reliable, the complexity of placental arborized structure requires measuring so many histology items that data reduction is required before examination of the predictive effects of different patterns of placental arborized structure. Various strategies of data reduction can be employed.

Reliability and Validity of Measures

While data might be reduced to a parsimonious set of factors, the factors may not reliably measure what they are intended to measure. In evaluating reliability of quantification of individual histology items and of the EFA/CFA factors, several reliability tests can be used. For example, multiple tissue samples from one placenta are multiple "tests" of that placental structure. As another example, "testretest" reliability can assess reliability of histology item quantification and also the extent to which placental structure (reflected in factors as combinations of related histology item scores) is stable across multiple tissue "tests".

The analysis methods may generate a large number of quantified variables relating to aspects of histology items, many of which are intercorrelated. When many potentially parallel histology items are present, histology items can be split in two to test "alternate forms" reliability. This approach can test whether items missing could be substituted with other items and the overall measures remain reliable. Such flexibility allows for tools to be robust to inevitable variability in tissue sampling techniques (that may result in missing histology items) when employed on large populations. Generalizability is the extent to which the measurement process is equivalent across dimensions. Potential sources of variation include, for example, gestational age at delivery, maternal disease states (e.g., preeclampsia, diabetes), and exposures (e.g., maternal smoking). Procedures described herein are sufficient to test whether the measures are consistent across strata.

To determine the associations between placental structure and childhood outcomes, structural equation modeling (SEM) can be employed. SEM explicitly models factors as mirrors of latent variables to test the relationships among factors, covariates and outcomes. MPlus (Muthen and Muthen, 2006) is an especially flexible SEM tool that accommodates categorical and continuous latent variables, and latent class analysis. SEM is a linear modeling approach and, as such, provides for modeling factors that are linear combinations of histology items.

Diffusion and Diffusion Screening in the Placental Villi

The mature placenta is a complex arborized vascular bed extending from the umbilical arteries to the chorionic surface vessels, to the fetal stem vessels and ultimately to the capillary beds of the terminal villi, the anatomical sites of all oxygen and nutrient exchange between the mother and the fetus. The capillary beds drain into a venous system that parallels the arterial tree, ultimately draining into chorionic surface veins and the umbilical vein that carries blood to the fetus.

The fetal blood is contained in the fetal capillaries of the chorionic and the maternal blood flows in the intervillous space. The placenta can therefore be conceptualized as an exchange unit. The respiratory functions of the placenta make it similar to lungs in terms of exchange of oxygen and carbon dioxide. Respiratory transfer from the mother, across the placenta, to the fetus occurs in three steps: first, the maternal blood brings oxygen to the intervillous space which bathes the fetal chorionic villi; second, oxygen permeates across the villus surface and diffuses inside the villusstroma toward the fetal capillaries; third, oxygen is transported to the fetus via fetal blood. The explicit separation of the transport in these three steps is not only physically justified, but it allows one to consider each step separately, the output data of one step serving as the input data for the next step.

As the villous and bronchial structures are both branched, it is natural to expect analogies between the fetal blood flow in the fetal capillary tree (the third step of the placental function) and the air flow in the bronchial tree. The first two steps of the placental function also have many common physical features with the oxygen transport in the lungs, although the maternal intervillous space has no true vascular structure and merely forms a pool around the villi. In this analogy "screening" effects are considered along with their potential relation to diseases. This consideration relies on a comparative analysis of high-resolution two-dimensional (2d) cuts of normal and pathological placentas.

We first focus on the step in which oxygen dissolved in the maternal blood is brought by flow into the maternal intervillous spaceto access the placental villi. Maternal blood flows through—100-150 uteroplacental arteries and enters the intervillous space at a high flow rate but a very low pressure (10-15 mm Hg). This oxygen rich maternal blood bathes the villi, containing capillaries carrying poorly oxygenated fetal blood. Driven by this difference in partial pressures, oxygen permeates from the intervillous space to the villi across the villous surfaces, the maternal and fetal circulations remaining separate. In turn, carbon dioxide permeates the villous surface in the opposite direction, from the villi to the intervillous space. After oxygen and carbon dioxide are exchanged, the oxygen-depleted maternal uteroplacental arterial blood drains out of the intervillous space and returns to the maternal circulation via the endometrial veins.

The placental villous branches (with, at their tips, the terminal villi) present geometric obstacles to maternal intervillous flow; maternal intervillous flow rate declines from the basal to the chorionic plate. From the perspective of maternal perfusion, intervillous blood flow will access individual terminal villi at different flow rates, greater for terminal villi closer to the maternal basal plate, and slower for terminal villi near the chorionic plate (the fetal surface of the placenta). This is analogous to what happens in the bronchial tree of the lungs, in which fresh air is inhaled through the mouth at relatively high velocity and then substantially slowed down as it moves into the distal bronchioles (with their greater total cross-section area).

Normal Versus Abnormal (Pathological) Placentas

Various processes (maternal diseases, environmental exposures, etc.) can lead to abnormal growth of the placental villous tree. Abnormal development of the placental villous tree (over growth or sparse branching) makes either or both maternal uteroplacental blood flow around the villi and fetoplacental blood flow within the villi less efficient; both contribute to abnormal placental-fetal transport. Transport is more efficient when all the terminal villous surfaces are equally accessible to the maternal uteroplacental intervillous blood. However, an abnormally grown placenta with an increased number and/or size of villi (e.g., diabetic placentas) may have "crowded" villi. Villi in too close proximity may "shield" each other from the maternal perfusion and limit their function. As a result of over crowding, maternal blood cannot flow easily around these terminal villi, and transfer of oxygen from the maternal circulation across the villus surface is substantially reduced. Dense packing of the villi makes them more "shielded" (or "screened") to the flow of the maternal uteroplacental intervillous blood. Conversely, too sparse villous arborization results in maternal uteroplacental intervillous blood flow that cannot adequately access terminal villi; maternal blood may flow into and out of the intervillous space without encountering villi and transferring any oxygen, another type of inefficiency.

From this functional point of view, the difference between normal and pathological placentas resembles the difference in functioning of the lung acinus at exercise and at rest. In the normal placenta, all the terminal villi are accessed more or less equally around their entire perimeter by the maternal uteroplacental intervillous blood (as the alveolar membrane is accessed by oxygen at exercise). In pathologically "overgrown" placentas, the intervillous space is crowded with villi so that only a fraction of the terminal villous surfaces can be accessed (only a part of the alveolar membrane near the acinus entrance is accessed at rest). The effect of diffusion screening is expected to play a crucial role in placental transport, especially in abnormal placentas (e.g., for diabetic women). Although the lung-placenta analogy is instructive, there is a significant difference between the lungs and the placenta. In the placenta, the maximal accommodations to blood flow are part of normal pregnancy, e.g., maternal heart rate increases, total peripheral resistance drops, plasma volume increases resulting in a dilutional anemia that reduces shear stress, as well as hormonally dependent increases in endometrial flow. Thus, there are no more physiologic adaptations that can be made to increase intervillous perfusion. In contrast, one can increase alveolar aeration by increasing rate and depth of inhalation in order to "switch" between reduced efficiency of the lungs at rest and their "full" efficiency at exercise.

Having described the invention in detail, it will be apparent that modifications, variations, and equivalent embodiments are possible without departing from the scope of the invention defined in the appended claims. Furthermore, it should be appreciated that all examples in the present disclosure are provided as non-limiting examples.

REFERENCES CITED

All publications, patents, patent applications, and other references cited in this application are incorporated herein by reference in their entirety for all purposes to the same extent as if each individual publication, patent, patent application or other reference was specifically and individually indicated to be incorporated by reference in its entirety for all purposes. Citation of a reference herein shall not be construed as an admission that such is prior art to the present invention.

EXAMPLES

The following non-limiting examples are provided to further illustrate the present. It should be appreciated by those of skill in the art that the techniques disclosed in the examples that follow represent approaches the inventors have found function well in the practice of the invention, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the invention. It shall be understood that any method described in an example may or may not have been actually performed, or any composition described in an example may or may not have been actually been formed, regardless of verb tense used.

Example 1

Extracting Neutrophils

A placental sample was taken from the placental membranes of a term fetus. A slice of the tissues was prepared using the standard procedure for preparing a histology slide. The tissue was fixed in formalin, de-hydrated, embedded in a paraffin block, a thin slice was microtomed from the block, and affixed to a glass slide. The slide was placed in an Aperio T3 slide digitizer and the image produced at a magnification of 20×. The digitized image was processed using the SFCM algorithm. The parameters of the algorithm were set to extract the color differences of the neutrophils. Both the original image and the extracted image are shown in FIG. 1. The extracted image separates the neutrophils from the remainder of the image. The high incidence of neutrophils indicates a higher risk that this child will develop Cerebral Palsy.

Example 2

Extracting Tissue Edema

Figure 2:
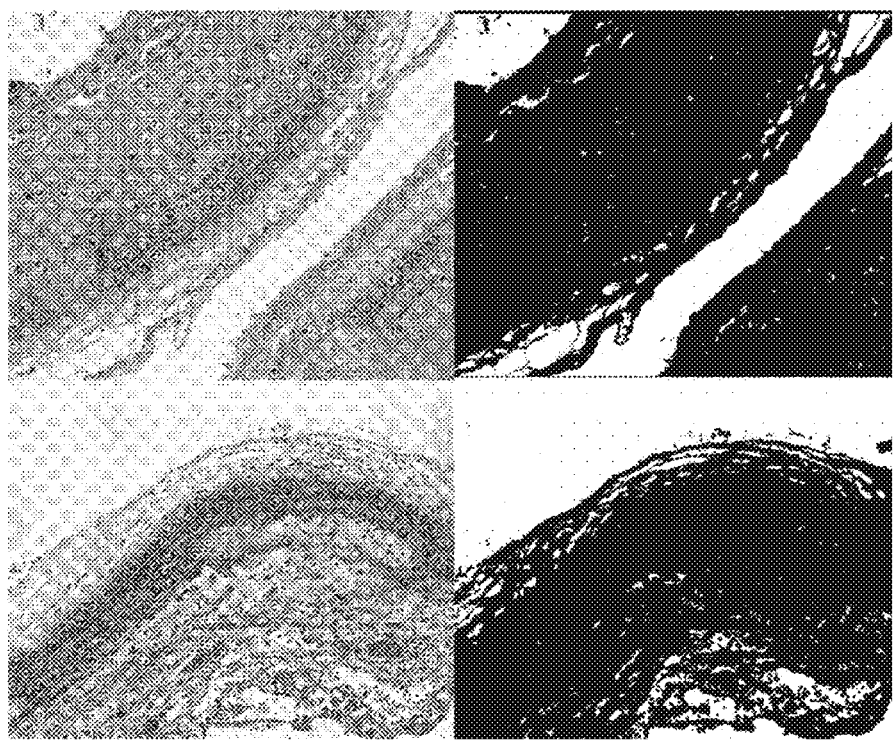
FIG. 2 is a pair of before and after images of placental tissue processed by a spatial fuzzy c-means algorithm (SFCM algorithm). In this application of the algorithm the parts of the image that show an edema of the connective tissue have been extracted.

A placental sample was taken from the umbilical cord of a term fetus. A slice of the tissues was prepared using the standard procedure for preparing a histology slide. The tissue was fixed in formalin, de-hydrated, embedded in a paraffin block, a thin slice was microtomed from the block, and affixed to a glass slide. The slide was placed in an Aperio T3 slide digitizer and the image produced at a magnification of 20×. The digitized image was processed using the SFCM algorithm. The parameters of the algorithm were set to extract the clear areas that characterize edema. Both the original image and the extracted image are shown in FIG. 2. The extracted image separates the areas of edema from the remainder of the image. The presence and extent of edema indicates an abnormal tissue function associated with poor neurodevelopmental outcome.

Example 3

Extracting Connective Tissue

Figure 3:
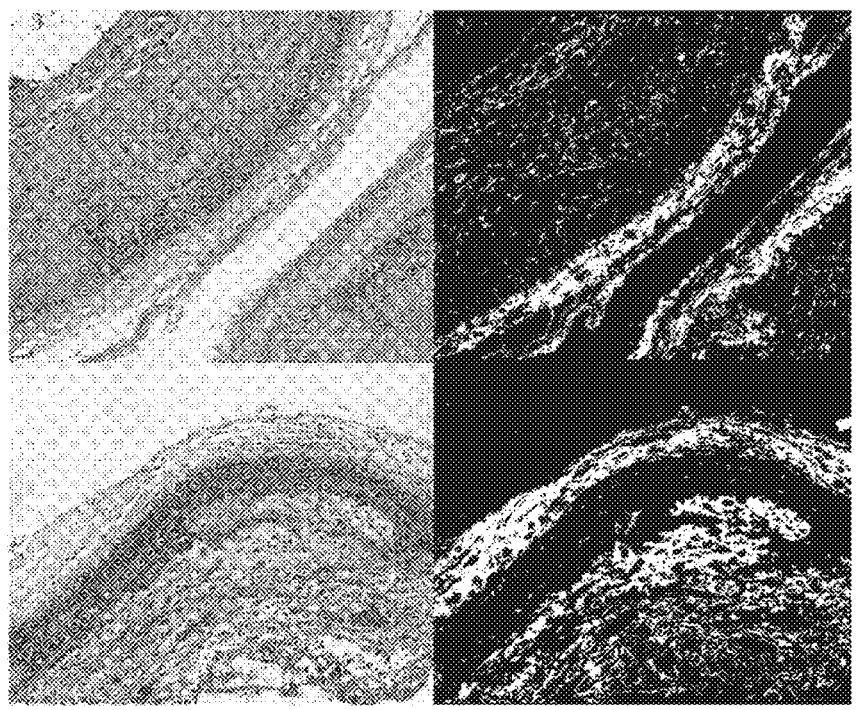
FIG. 3 is a pair of before and after images of placental tissue processed by a spatial fuzzy c-means algorithm (SFCM algorithm). In this application of the algorithm the parts of the image that show views of the connective tissue have been extracted.

A placental sample was taken from the placental membranes of a term fetus. A slice of the tissues was prepared using the standard procedure for preparing a histology slide. The tissue was fixed in formalin, de-hydrated, embedded in a paraffin block, a thin slice was microtomed from the block, and affixed to a glass slide. The slide was placed in an Aperio T3 slide digitizer and the image produced at a magnification of 20×. The digitized image was processed using the SFCM algorithm. The parameters of the algorithm were set to extract the grayscale intensity differences of the characterize connective tissues. Both the original image and the extracted image are shown in FIG. 3. The extracted image separates the connective tissues from the remainder of the image. The damage seen in the connective tissues of the fetal placenta reflects breakdown of those tissues from digestive enzymes which are associated with an increased risk of damage to the child's heart, lungs, and brain.

Example 4

Placental Shape as Reflective of Placental Function as a Fractal Network

Subjects were a subset of the National Collaborative Perinatal Project (NCPP). Details of the study have been described elsewhere [19, 20]. Briefly, from 1959 to 1965, women who attended prenatal care at 12 hospitals were invited to participate in the observational, prospective study. At entry, detailed demographic, socioeconomic and behavioral information was collected by in-person interview. A medical history, physical examination and blood sample were also obtained. In the following prenatal visits, women were repeatedly interviewed and physical findings were recorded. During labor and delivery, placental gross morphology was examined and samples were collected for histologic examination. The children were followed up to seven years of age. Placental gross measures included placental disk shape, relative centrality of the umbilical cord insertion, estimated chorionic plate area, disk eccentricity, placental disk thickness, placental weight, and umbilical cord length, measured according to a standard protocol. Gestational age was calculated based on the last menstrual period in rounded weeks. Among 41,970 women who gave the first or only singleton live birth, 36,017 contributed placenta data. The analytic sample was restricted to those with complete data on the six placental gross measures, placental weight and birth weight, of gestational ages >=34 weeks (younger infants having been unlikely to survive) and less than 43 completed weeks (given that gestations were assigned implausible gestational lengths up to 54 weeks, N=24,061). The original coding of placental measures and the recoding used for this analysis follow:

Chorionic disk shape coding was based on the gross examination of the delivered placenta. Shapes included round-to-oval, and a variety of atypical shapes (e.g., bipartite, tripartite, succenturiate, membranous, crescent or "irregular"). Only 926 (3.8 percent) were labeled as one of the 6 categories of shape other than round-to-oval. For this analysis, the shape measure was recoded as a binary variable with "round-to-oval" as "0" and "other than round-to-oval" as "1".

Relative centrality of the umbilical cord insertion was calculated from two variables recorded in the original data set. The distance from the cord insertion to the closest placental margin was recorded to the nearest cm. The type of umbilical cord insertion was coded as membranous (velamentous), marginal or normal (inserted onto the chorionic disk). We combined these two variables into a single distance measure, by recoding velamentous cord insertions as a negative value, cords inserted at the placental margin as "0" and progressively more central cords as "1" to "9" (overall scale range −13 to 13).

Estimated chorionic plate area was calculated as the area of an ellipse from two variables recorded in the original data set, the larger diameter and smaller diameter of the chorionic disc were recorded in cm. Disk eccentricity was calculated as the ratio of the larger and smaller diameters. Both the chorionic plate area and disk eccentricity could be cast as "interactions" between larger and smaller disk diameters.

Placental thickness at the center of the chorionic disc was recorded in units of 0.1 cm, by piercing the disc with a knitting needle on which millimeter marks were inscribed.

Placental weight was measured in decagrams to the nearest 10 grams; this variable was converted to grams.

The fetoplacental weight ratio was calculated as birth weight divided by the placental weight, and is a value generally considered to reflect a physiologic state of balance between fetal and placental growth.

Umbilical cord length was analyzed as it was measured in the Labor and Delivery Room. Cord lengths ranged from seven to 98 cm.

Maternal characteristics were recorded at enrollment. Maternal age was coded as age at (enrollment) in years, and maternal height was measured in inches. Maternal weight prior to pregnancy was self-reported in pounds. Body mass index (BMI) was calculated from maternal height and weight. Parity counted all delivered live born offspring and did not include miscarriages/early pregnancy losses. Socioeconomic status index was a combined score for education, occupation and family income as scaled by the US Bureau of the Census. [21] Mother's race was coded as a binary variable denoting African-American as "1" and all others as "0"; original data coded race as Caucasian, African American, and "other", most of whom were Puerto Ricans (9.2 percent). Cigarette use was coded by maternal self report at enrollment as non-smoker (coded as <1 cigarette per day), or by the self-reported number of cigarettes smoked daily grouped as 1-9, 10-20, and >20 (greater than one pack per day).

The allosteric metabolic equation was solved for estimates of $\alpha$ and $\beta$. Specifically, $PW = \alpha (BW)^\beta$ is rewritten as a standard regression equation and solved for $\alpha$ and $\beta$:

$$\text{Log}(PW) = \text{Log } \alpha + \beta \text{ Log}(BW) \quad \text{[Equation 1.1]}$$

$$\text{From Equation 1.1, Log } \alpha = \text{Log}(PW) - \beta[\text{Log}(BW)] \quad \text{[Equation 1.2]};$$

Substituting the mean $\beta$ for the population, this second equation was solved for each case, and the calculated Log $\alpha$ was exponentiated and used as a dependent variable in subsequent analyses. Spearman's rank correlations and multivariate regression were used to determine significant associations with $P<0.05$ was considered significant throughout. Three analyses were run. The first included all placental variables; thus the point-estimate of effect for each placental variable is adjusted for the presence of the others. The second included all maternal and fetal variables; again, data presented reflect effects adjusted for the presence of the other maternal variables. The third analysis included all variables (placental, maternal and fetal). Table 1 shows that the mean $\beta$ was 0.78,—equal to the scaling of a fractal transport network.

TABLE 1

Descriptives of the placental measures (N = 24,061).

| | Overall Population | |
|---|---|---|
| | Mean (SD) | Range |
| $\alpha$ | −0.25 (0.17) | 01.23, 0.62 |
| $\beta$ | 0.78 (0.02) | 066, 0.89 |

Table 2 shows that each of the (crudely measured) placental dimensions altered the equation relating placental weight and birth weight.

TABLE 2

Placental, maternal and fetal influences on a

| | | Variable | | |
|---|---|---|---|---|
| | | Multivariate model- Placental variables only (N = 24,061) | Multivariate model- Maternal and fetal variables only (N = 21,603) | Multivariate model - All variables (N = 21,603) |
| Placental shape | Round-oval (23,131) Other than round/oval (930) | −0.021 (0.005)*** | | −0.019 (0.005)*** |
| Chorionic plate area | | −0.001 (0.000)* | | 0.001 (0.000)*** |
| Disk ellipsivity | | 0.167 (0.032)*** | | 0.158 (0.0031)*** |
| Larger diameter | | 0.016 (0.004)*** | | 0.030(0.004)*** |
| Smaller diameter | | 0.042 (0.004)*** | | 0.054 (0.004)*** |
| Disc thickness | | 0.010 (0.000)*** | | 0.013(0.000)*** |
| Cord length | | 0.001 (0.000)*** | | 0.001 (0.000)*** |
| Relative cord eccentricity | | 0.014 (0.007)* | | 0.008 (0.007) |
| Maternal age | | | 0.000 (0.000) | −0.001 (0.000)** |
| Parity | | | 0.000 (0.000) | 0.001 (0.001)* |
| Smoking | | | 0.022 (0.001)*** | 0.017(0.001)*** |
| Infant gender | | | 0.020 (0.002)*** | 0.018 (0.002)*** |
| Birth length | | | 0.002 (0.000)*** | −0.011(0.000)*** |
| Maternal BMI | | | −0.001 (0.000)*** | −0.001 (0.000)*** |
| Socioeconomic status | | | 0.000 (0.001) | −0.008(0.001)*** |
| African-American race | | | 0.002 (0.003) | 0.023 (0.002)*** |
| Gestational age | | | −0.007 (0.001)*** | −0.009(0.001)*** |

***P < 0.0001 bolded and italicized;
**P < 0.001;
*Ps −0.05;
Not bolded, P > 0.05.

In a modern data set with our more sensitive and valid methods of measuring placental shape, we were more direct. Using the population $\alpha$ derived from the Collaborative Perinatal Project, we solved for $\beta$, and subtracted the calculated $\beta$ from the population $\beta$, and explored the relationships between "delta β" and the irregularity of the placental shape measured in 3 ways: 1. From the centroid of the placental shape (the mathematical center of the placenta, a physiologically arbitrary point); 2. From the site of umbilical cord insertion, the actual point of origin of the placental fractal vascular network; and 3. The roughness, calculated as the ratio of the perimeter to that of the smallest convex hull. Deviations from the ideal fractal scale were uncorrelated with the biologically arbitrary centroid, but were highly correlated with both the radial deviation from the umbilical cord insertion, and the roughness, a general measure of perimeter irregularity.

TABLE 3

Correlation of the deviation from a round shape with a deviation from the ¾ rule.

|  |  | beta3_4 |
|---|---|---|
| Radial standard deviation of the plate area from the centroid | Pearson Correlation | .020 |
|  | Significance | .485 |
|  | N | 1199 |
| Radial standard deviation of the plate area from the umbilical cord | Pearson Correlation | −.076 |
|  | Significance | .009 |
|  | N | 1187 |
| Roughness = ratio of the perimeter to that of the smallest convex hull | Pearson Correlation | .091 |
|  | Significance | .002 |
|  | N | 1199 |

In another data set the blood vessels were traced on digital images of the placental chorionic surface. A distance measurement algorithm was applied to the image to determine the distance from each pixel to the nearest blood vessel. A metric was calculated using the mean distance divided by the placental diameter. Regression of that metric versus birth weight data showed that it accounted for 25% of birth weight variation.

Example 5

Seven Slides

A set of 7 slides considered paradigms for major types of placental growth included: Normal placenta at 31 weeks (defined as prevalence of immature intermediate and mesenchymal villi, absent mature intermediate and terminal villi, poorly matured stem villi), Immature placenta at term (defined as prevalence of mature intermediate and stem villi, paucity of immature intermediate and terminal villi), Normal term placenta (defined as an even distribution of all types of villi), Preterm preeclampsia at 31 weeks (defined as poorly branched, extremely tiny, filiform terminal villi and an unusually wide intervillous space due to reduced terminal branching), Term preeclampsia (defined as a generally even distribution of all villus types), and two cases of malformed villi with normal numerical mixture of villous types). A minimal set of villous morphometric algorithms developed with ECognition software was applied to these 7 slides.

Slide Digitization: Slides were digitized using an Aperio T3 instrument that is a self-contained system for image capture, manipulation and management. This included tissue finding, auto-focusing, automated scanning, image compression and slide quality assessment. All relevant image capture parameters (e.g., file name, ScanScope ID, scan time, barcode, quality score, the directory path to the virtual slide image, etc.) are stored in a Virtual Slide Manager database (Aperio, Vista, Calif.). The slides were stored as JPEG compatible .sys files for optimal computational speed within the ECognition framework.

Results showed that villous histologic features were reduced to 13 variables related to villous size and/or villous capillary location. At least 2 and as many as 5 variables significantly distinguished the abnormal patterns from the paradigm normal pattern ($p<0.05$).

TABLE 4

Factor means comparing pathology types to "normal"

|  | Malformed at term | Preterm/immature | Immature/term | Preterm preeclampsia | Term preclampsia |
|---|---|---|---|---|---|
| Factor 1 | −0.08 v. 0.15 | −.021 v. 0.13 | 0.04 v. −0.90 | 0.15 v. −076 | −0.13 v. 0.41 |
| Factor 2 | −0.26 v. 0.45 | 0.04 v. −0.27 | 0.0 v. −0.14 | −0.14 v. 0.70 | 0.29 v. −0.96 |
| Factor 3 | 0.23 v. −0.40 | 0.02 v. −0.11 | 0.02 v. −0.36 | −0.04 v. 0.21 | −0.22 v. 0.73 |
| Factor 4 | −0.15 v. 0.26 | −0.04 v. 0.21 | −0.02 v. 0.51 | 0.10 v. −0.50 | 0.05 v. −0.17 |
| Factor 5 | −0.05 v. 0.08 | 0.02 v. −0.14 | 0.00 v. −0.21 | 0.08 v. −0.41 | −0.06 v. 0.21 |
| Factor 6 | 0.09 v. −0.16 | 0.00 v. −0.01 | 0.01 v. −0.21 | −0.10 v. 0.48 | 0.00 v. 0.00 |
| Factor 7 | 0.04 v. −0.08 | 0.06 v. −0.34 | 0.00 v. −0.04 | −0.03 v. 0.15 | −0.06 v. 0.19 |
| Factor 8 | 0.02 v. 0.04 | 0.02 v. −0.49 |  |  |  |
| Factor 9 | −0.20 v. 0.04 | −0.20 v. 0.82 |  |  |  |

In the 7 hematoxylin and eosin stained samples of placental villous branching morphogenesis types (paradigms for major types of placental growth), 80 variables were analyzed and reduced to 9 factors using principal components factor analysis (PCA) (see Table 4). The 6 paradigm patterns of abnormal placental villous branching were distinguishable from "term normal" by >1 factors, suggesting the present approach is tenable.

In the original test of 7 slides (see above), several variables could not be calculated; segmentation criteria were not robust to the full range of villous variability. Algorithms were revised and applied to 23 digitalized slides containing at least 1.5 MB of tissue data. 131 variables were calculated. Principal components analysis yielded 16 factors that together accounted for—88% of total data variance (see Table 5).

TABLE 5

PCA results showing 5 factors acount for ⅔ of data variance

| | Initial Eigenvalues | | |
|---|---|---|---|
| Component | Total | % of Variance | Cumulative % |
| Factor 1 | 40.584 | 36.56 | 36.56 |
| Factor 2 | 11.518 | 10.38 | 46.94 |
| Factor 3 | 9.296 | 8.38 | 55.31 |
| Factor 4 | 7.386 | 6.65 | 61.97 |
| Factor 5 | 4.954 | 4.46 | 66.43 |
| Factor 6 | 4.293 | 3.87 | 70.30 |
| Factor 7 | 3.601 | 3.24 | 73.54 |
| Factor 8 | 3.190 | 2.87 | 76.42 |
| Factor 9 | 2.700 | 2.43 | 78.85 |
| Factor 10 | 1.841 | 1.66 | 80.51 |
| Factor 11 | 1.709 | 1.54 | 82.05 |
| Factor 12 | 1.551 | 1.40 | 83.45 |
| Factor 13 | 1.457 | 1.31 | 84.76 |
| Factor 14 | 1.251 | 1.13 | 85.89 |
| Factor 15 | 1.172 | 1.06 | 86.94 |
| Factor 16 | 1.114 | 1.00 | 87.95 |

Thus, automated assessment of placental villous branching growth is informative in clarifying placental pathology and by extension fetal pathophysiology.

Example 6

Macroscopic Placental Measurement Tool

A random sample of 50 Kodachrome slides was obtained from Avon Longitudinal Study of Parents and Children (ALSPAC) and digitized using a computer linked Canon Canoscan FS2710. Images suitable for the graphical analysis methods were selected by a placental pathologist and epidemiologist.

Figure 7:
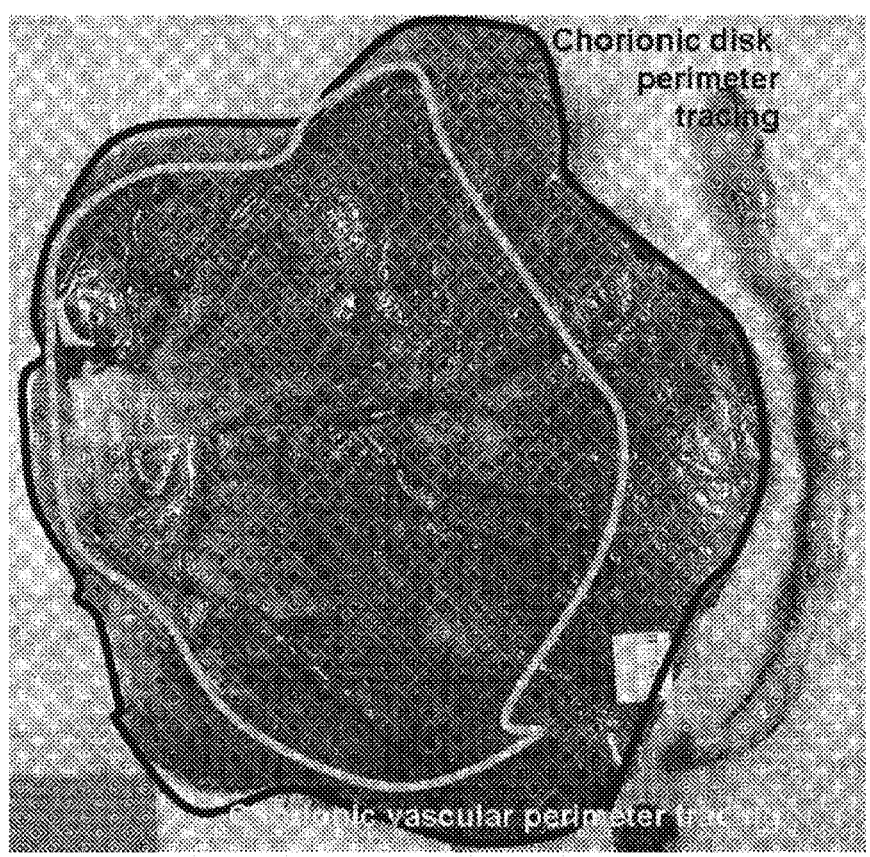
FIG. 7 is a digitized photograph of the placental chorionic surface marked for the umbilical cord insertion, the disk perimeter (outer marking), and terminal points of chorionic vascular plate branches (inner marking). The ratio of these areas is associated with decreased observed/expected birth weight.

A set of Excel-based macros were developed that capture and organize the mouse-clicks of a Kurta Graphics tablet. From digitized photographs of the placental chorionic surface, the umbilical cord insertion, the disk perimeter and terminal points of chorionic plate vasculature were marked (see e. g., FIG. 7). A second macro captured placental chorionic vasculature stereologically with a spiral grid of pitched at 1 cm intervals with the origin centered at the umbilical cord insertion. At each intersection of a placental chorionic vessel with the spiral, the sides of the vessel were marked, from which vessel numbers and calibers were calculated at distances from the umbilical cord insertion. A third macro traced the outlines of placental disk slices. The placenta was sliced in 8ths, creating 7 unique surfaces from which placental volume can be estimated without bias following Cavalieri's method. The macro also calculated mean and standard deviation of thickness, and minima and maxima relative to the cord insertion site and margins.

Standard regression analysis of placental chorionic surface characteristics was performed. The simple perimeter of the placental chorionic surface, oriented to cord insertion and disk edge closest to the site of membrane ruptured captured as much birth weight variance as placental weight. Novel measures accounted for more than twice the birth weight variance of current pathology standard measures (a single pair of diameters, and a single measure of disk thickness (c.f., Salafia et al, Am J Epidemiol 2005)).

Example 7

Testing Predictive Value for Abnormal Childhood Somatic Development

No comparable placental measures have been calculated previously in any of the national and international birth cohorts that have childhood follow-up. However, crude measures of the placental disk (a pair of placental chorionic disk diameters and one measure of disk thickness) were collected in the National Collaborative Perinatal Project (NCPP, recruited 1959-1966, see reprint Salafia et al, 2006 in review). Extracted was the first singleton liveborn of each family in the NCPP delivered at ≥34 gestational weeks (N=15,399). Body mass index (BMI) and IQ at age 7 years were regressed against z-scored placental weight, birth weight and estimated placental chorionic surface area (calculated from the larger and smaller placental disk diameters) and disk thickness. Placental chorionic surface area and disk thickness were independently associated with BMI and IQ at age 7 years after adjustment for birth and placental weights. These standard placental measures are not only crude but they more poorly measure more unusually shaped (and more poorly grown) placentas than more normal round, oval and uniformly thick placentas. Despite limitations, the above analysis demonstrates effects on both bodily growth and IQ at age 7 and supports the approach of using comprehensive placental measures to yield useful predictions of childhood health risks.

TABLE 6

Regression
Dependent Variable: Zscore Age 7 IQ
Predictors: Chronological age at the time of IQ test, Zscore chorionic plate area, Zscore placental thickness(lcms), Zscore cord length(cms), Zscore birthweight, gms

| Model Summary | | | | |
|---|---|---|---|---|
| Model | R | R Square | Adjusted R Square | Std. Error of the Estimate |
| 1 | .250 | .063 | .062 | .97170116 |

| ANOVA | | | | | | |
|---|---|---|---|---|---|---|
| Model | | Sum of Squares | df | Mean Square | F | Sig. |
| 1 | Regression | 1952.285 | 5 | 390.457 | 413.531 | .000(a) |
| | Residual | 29283.517 | 31014 | .944 | | |
| | Total | 31235.802 | 31019 | | | |

TABLE 6-continued

Regression
Dependent Variable: Zscore Age 7 IQ
Predictors: Chronological age at the time of IQ test, Zscore chorionic plate area,
Zscore placental thickness(1cms), Zscore cord length(cms), Zscore birthweight, gms

| | Coefficients | | | |
|---|---|---|---|---|
| | Unstandardized Coefficients | | | |
| Model | B | Std. Error | t | Sig. |
| 1  (Constant) | 791 | .058 | 13.751 | .000 |
| Zscore birthweight, gms | .076 | .006 | 11.853 | .000 |
| Zscore cord length(cms) | .134 | .006 | 23.194 | .000 |
| Chronological age at time of test | −.002 | .000 | −12.977 | .000 |
| Zscore placental thickness (.1 cms) | .118 | .006 | 20.466 | .000 |
| Zscore chorionic plate area | .043 | .006 | 6.916 | .000 |

TABLE 7

Regression
Dependent Variable: Body Mass Index (BMI) at age 7 years
Predictors: (Constant), Zscore Placental thickness, Zscore Chorionic plate area,
Zscore length of cord (cms), Zscore birthweight(gms), Zscore placental weight (gms)

| | Model Summary | | | |
|---|---|---|---|---|
| Model | R | R Square | Adjusted R Square | Std. Error of the Estimate |
| 1 | .195 | .038 | .038 | 1.81252 |

| | | ANOVA | | | |
|---|---|---|---|---|---|
| Model | Sum of Squares | df | Mean Square | F | Sig. |
| 1  Regression | 2000.113 | 5 | 400.023 | 121.8 | .000 |
| Residual | 50569.281 | 15393 | 3.285 | | |
| Total | 52569.394 | 15398 | | | |

| | Coefficients | | | |
|---|---|---|---|---|
| | Coefficients | | | |
| Model | B | Std. Error | t | Sig. |
| 1  (Constant) | 15.965 | .015 | 1093.013 | .000 |
| Zscore placental weight (gms) | .055 | .022 | 2.511 | .012 |
| Zscore length of cord (cms) | .074 | .015 | 4.898 | .000 |
| Zscore birthweight (gms) | .242 | .019 | 12.946 | .000 |
| Zscore Chorionic plate area | .059 | .019 | 3.157 | .002 |
| Zscore Placental thickness | .068 | .016 | 4.184 | .000 |

TABLE 8

Dependent Variable: Zscore: Age 7 IQ.
Predictors: Chronological age at the time of IQ test, Zscore gestational age at
delivery in weeks, Zscore birthweight, gms, log transformed score for fetal
inflammatory response in umbilical cord, log transformed score for maternal
inflammatory response in extraplacental membranes and chorionic plate

| | Model Summary | | | |
|---|---|---|---|---|
| Model | R | R Square | Adjusted R Square | Std. Error of the Estimate |
| 1 | .185(a) | .034 | .034 | .98736564 |

TABLE 8-continued

Dependent Variable: Zscore: Age 7 IQ.
Predictors: Chronological age at the time of IQ test, Zscore gestational age at delivery in weeks, Zscore birthweight, gms, log transformed score for fetal inflammatory response in umbilical cord, log transformed score for maternal inflammatory response in extraplacental membranes and chorionic plate

ANOVA

| Model | | Sum of Squares | df | Mean Square | F | Si. |
|---|---|---|---|---|---|---|
| 1 | Regression | 960.896 | 5 | 192.179 | 197.129 | .000 |
| | Residual | 27224.804 | 27926 | .975 | | |
| | Total | 28185.700 | 27931 | | | |

Coefficients

| Model | | Coefficients B | Std. Error | t | Sig. |
|---|---|---|---|---|---|
| 1 | (Constant) | .782 | .061 | 12.765 | .000 |
| | Zscore birthweight, gms | .142 | .006 | 22.451 | .000 |
| | Chronological age at time of test | −.002 | .000 | −11.847 | .000 |
| | Zscore: gestational age at delivery, weeks | .025 | .006 | 3.865 | .000 |
| | log transformed score for fetal inflammatory response in umbilical cord | .240 | .020 | 12.182 | .000 |
| | log transformed score for maternal inflammatory response in extraplacental membranes and chorionic plate | .152 | .014 | 10.629 | .000 |

TABLE 9

Dependent Variable: Zscore: Age 7 IQ; Predictors: Chronological age at the time of IQ test, Zscore gestational age at delivery in weeks, Zscore birthweight, gms, log transformed score for infarct/abruption Model Summary

| Model | R | R Square | Adjusted R Square | Std. Error of the Estimate |
|---|---|---|---|---|
| 1 | .183 | .033 | .033 | .98683026 |

ANOVA

| Model | | Sum of Squares | df | Mean Square | F | Sig. |
|---|---|---|---|---|---|---|
| 1 | Regression | 1039.565 | 4 | 259.891 | 266.874 | .000(a) |
| | Residual | 30072.967 | 30881 | .974 | | |
| | Total | 31112.531 | 30885 | | | |

Coefficients

| Model | | Unstandardized Coefficients B | Std. Error | t | Sig. |
|---|---|---|---|---|---|
| 1 | (Constant) | .697 | .059 | 11.896 | .000 |
| | Zscore birthweight, gms | .145 | .006 | 24.235 | .000 |
| | Chronological age at time of test | −.002 | .000 | −11.800 | .000 |
| | Zscore: gestational age at delivery, weeks | .025 | .006 | 4.140 | .000 |
| | log transformed score for infarct/abruption | .108 | .008 | 13.578 | .000 |

Example 9

Refinement

The data set is a 1,000 case subset of the Avon Longitudinal Study of Parents and Children (ALSPAC), an internationally recognized longitudinal study of children's health. The data set has been used to help understand the contribution of genetic factors, antenatal risk factors, peripartum conditions to perinatal and/or childhood outcomes. 14,000 placentas were collected and stored. The analytic sample used, and to be used, according to methods described herein include 1000 cases with placental photographs and a minimum of 7 tissue samples processed into wax blocks and H&E slides.

Macroscopic

For macroscopic placental analysis, ALSPAC placental photographs, initially preserved as Kodachrome slides, are scanned using the Canon Canoscan FS2710 attached to a PC using Windows and stored as jpgs. Data are extracted from digitized images of placental chorionic surface and disk slices (see Example 3).

Figure 8:
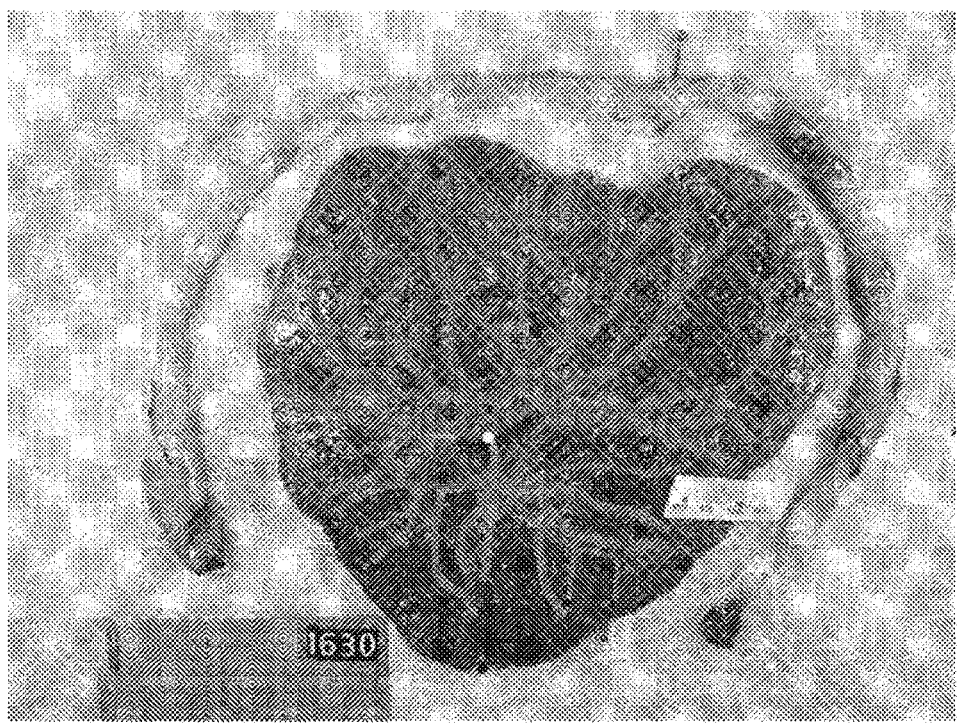
FIG. 8 is a digital image showing the chorionic surface vessels traced by hand.
Figure 9:
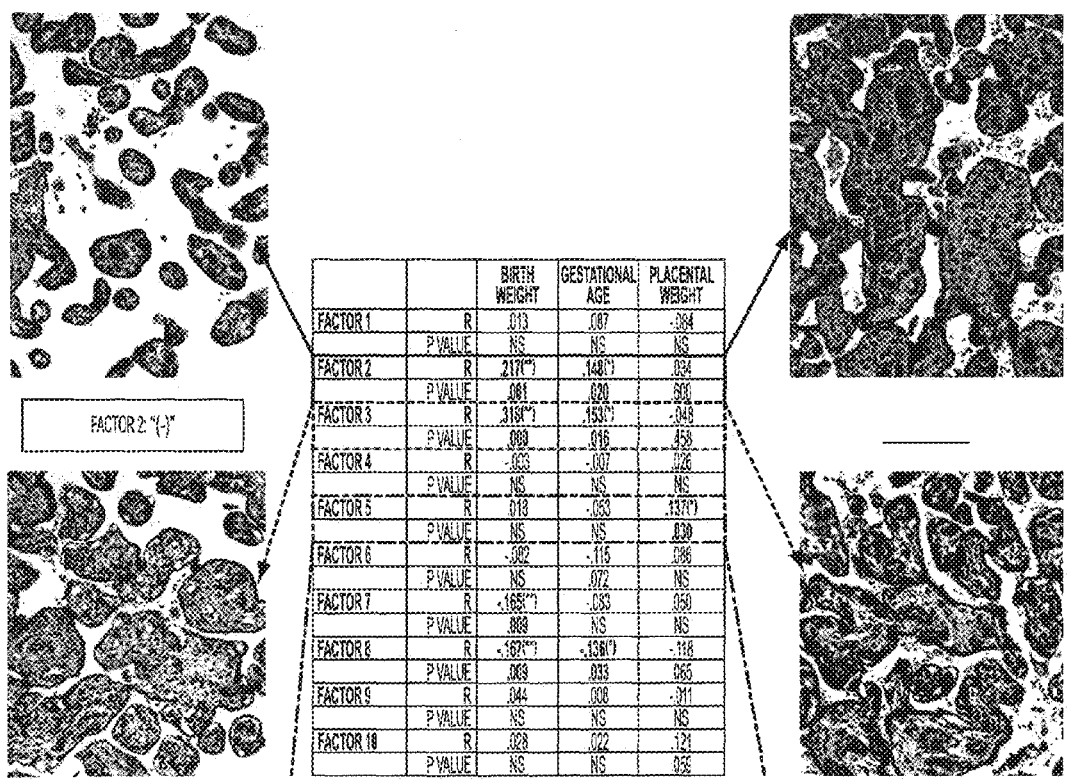
FIG. 9 is a series of photomicrographs depicting selected photomicrographs from cases with extreme low (negative) and high (positive) factor scores.

Additional data and orientation points are incorporated into the placental chorionic surface analyses (e.g., chorionic vascular branching and vessel calibers). As described above, the macros for chorionic vascular branching measurement have <5% inter-rater variability. Patterns of chorionic surface branching correlate with patterned villous branching in microscopic slides, and they combine to provide a measure that predicts the long term health of other organs that undergo contemporaneous (in utero) branching development. FIG. 8 shows an example of the tracing of chorionic vessel branching.

Disk thickness measures are incorporated into a single 3-dimensional macroscopic placental structural measurement model. Likewise, measurements of disk thickness (also with 5% inter-rater variability) that better capture its variability improve the ability to characterize placental structure. Moreover, differences in disk thickness may correlate with specific changes in microscopic patterned villous branching. Macroscopic and microscopic placental structural measures are likely to converge to identify abnormally stressful intrauterine environments. Data reductions by EFA/CFA and CN are compared, as for the microscopic tool.

Also, placental three-dimensional shapes are mathematically characterized, in terms of both chorionic plate area and disk thickness, as resulting from a single "disturbance" (or a "single hit") and those with shapes that would require multiple "disturbances" ("multiple hits"), a recognized antecedent to poor outcome. Shapes are also analyzed in terms of the relative severity of "disturbances" required to generate achieved placental shapes. Because early (perkimplantation) placentas are thought to have a basic shape (discoid, centered about the umbilical cord insertion), abnormal shapes that result from maternal uteroplacental stressors or "disturbances" that deform normal uniform centripetal expansion are better able to be characterized.

Microscopic

For microscopic placental analysis, H&E slides from ALSPAC aredigitized using an Aperio T3 instrument.

Example 10

Choronic Vascular "Fit", Cord Centrality, and Fetal Growth Restriction

The experiments described herein demonstrate that poor "fit" of the chorionic vessels to the chorionic plate area and asymmetric growth of vessels from the cord insertion are correlated with reduced fetal growth.

Figure 11:
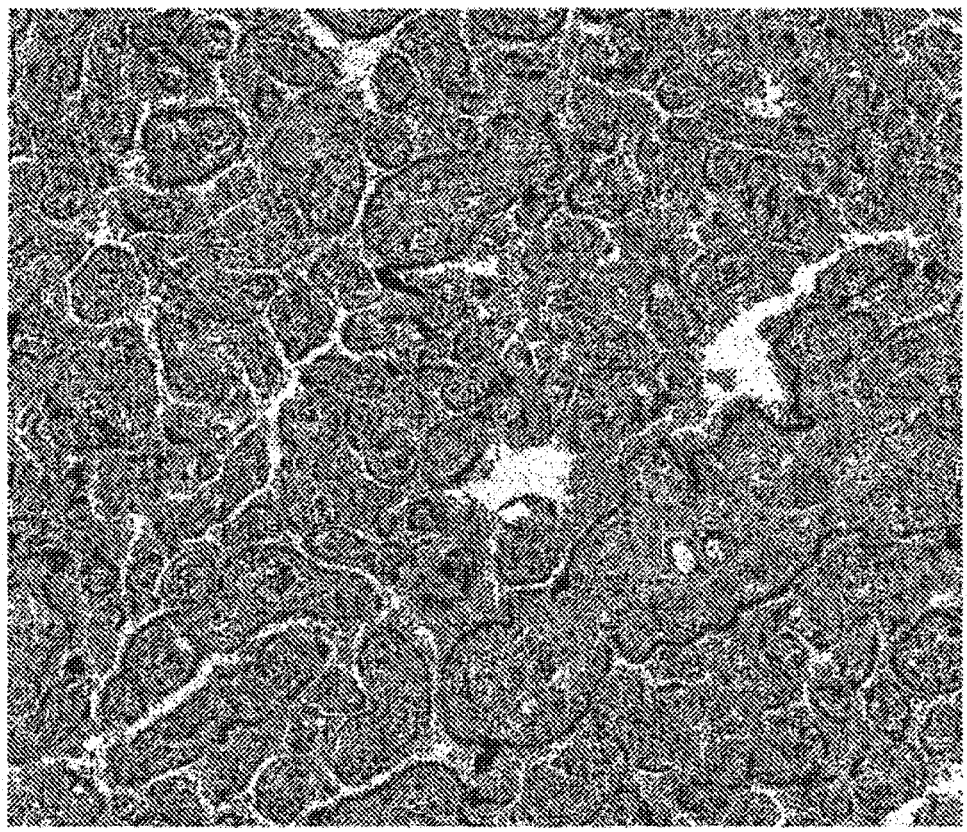
FIG. 11 is one of a series of registered histology slides, the registration of which demonstrates the capacity for the 3-D reconstruction of the placental finer villous tree.

314 consecutive consenting mothers delivering singleton live-born infants had placentas collected, and digitally photographed and weighed. The perimeter of the chorionic disk was traced; cord insertion and the sites at which each chorionic vessel dived beneath the chorionic plate were marked (see e.g., FIG. 7). More specifically, a print of the photograph was placed on a Kurta Graphics tablet, overlaid with a transparent 1 cm grid. X,Y coordinates were captured at each intersection of the perimeter with the grid, and additionally at any points of inflection. Then a second set of mouse clicks marked the end points of all chorionic plate surface vessels. The two shapes were interpolated. The area and perimeter demarcated by the diving sites was calculated. An algorithm calculated areas, and the centroid, the weighted center of the area The chorionic plate and the chorionic vascular area were essentially treated as a pair of shapes that should "fit". "Fit" is reflected in the distance between centroids. Dimensionless ratios of chorionic vascular area/perimeter and chorionic disk area/perimeter, distance between centroids of the inner and outer areas (intercentroid distance), and distance from cord insertion to the disk area centroid (FIG. 11) were analyzed with regression, with $p<0.05$ significant. Observed/expected birthweight ratio (O/E BW) was calculated from national 50th centile standards adjusting for gestational age, race, gender and parity.

Results showed that each measure was associated with O/E BW (parea=0.17, pperimeter=0.18, pinter-centroid=−0.18, pcord-centroid=−0.14) (see Table 6). Reduced area and perimeter ratios as well as greater inter-centroid distance ($P<0.004$) were related to reduced placental weight. In multiple regression, intercentroid and cord-centroid distances) retained independent effects on O/E BW ($p=0.015$, $p=0.04$). In a multivariate regression, the novel ratio measures accounted for 17% of O/E BW variance ($r=0.44$). Only intercentroid distance affected O/E BW independent of adjusted placental weight.

Area and perimeter ratios were normally distributed; inter-centroid and cord-centroid distances were skewed. Each was transformed and tested in univariate and multivariate regression. Only the intercentroid distance ("inintercent") affected O/E BW ratio independent of placental weight (see Table 7).

Chattanooga babies tended to be slightly smaller than expected (mean=0.98). Chattanooga placentas tended to be slightly larger than expected (mean=1.02).

TABLE 10

Distributions of Novel Chorionic Disk Measures and Ratios.

|  | Min | Max | Mean | SD |
|---|---|---|---|---|
| Chorionic plate area | 0.08 | 435.69 | 257.89 | 60.58 |
| Chorionic plate perimeter | 0.05 | 306.92 | 162.05 | 49.51 |
| Chorionic plate compactness | 0.53 | 0.99 | 0.93 | 0.06 |
| Chorionic plate standard deviation | 24.34 | 119.55 | 41.74 | 9.46 |
| Distance between chorionic vascular and chorionic plate centroids | 0.01 | 3.34 | 0.56 | 0.38 |
| Distance between chorionic vascular and chorionic plate | 0 | 0.2 | 0.04 | 0.03 |

TABLE 10-continued

Distributions of Novel Chorionic Disk Measures and Ratios.

|  | Min | Max | Mean | SD |
|---|---|---|---|---|
| centroids, normalized for scaling |  |  |  |  |
| Distance from cord insertion point to outer centroid | 0.04 | 17.82 | 3.61 | 2.29 |
| Distance between cord insertion point and outer centroid, normalized for scaling | 0.01 | 1.09 | 0.23 | 0.15 |
| Ratio of chorionic vascular and chorionic plate areas | 0.33 | 0.93 | 0.65 | 0.09 |
| Ratio of chorionic vascular area to chorionic vascular perimeter ("ruffling") | 0.13 | 16.6 | 0.37 | 0.93 |
| Ratio of chorionic plate area to chorionic plate permitter ("ruffling") | 0.88 | 3.23 | 1.65 | 0.29 |
| Placental weight adjusted for Gestational age | 248.84 | 920.83 | 465.56 | 104.1 |
| Birth weight adjusted for gestational age | 1783.4 | 5896.4 | 3052.4 | 474.4 |
| Observed/expected placental weight ratio | 0.47 | 2.58 | 1.02 | 0.25 |
| Observed/expected birth weight ratio | 0.55 | 1.61 | 0.98 | 0.15 |

This data set was a consecutively collected series of singleton placentas of liveborn, non-anomalous infants born at Erlanger Hospital, Chattanooga, TN, July-August 2005. The series was collected to explore environmental contributions to a LBW epidemic that has led to county-wide LBW rates of 14+%. LBW rates were 17% in samples herein, with PTD rates of 11%.

TABLE 11

Regression: Dependent- Observed/Expected Birth weight ratio

|  | B | Std. Error | t | Sig. |
|---|---|---|---|---|
| (Constant) | .34 | .39 | .86 | .39 |
| Ratio of chorionic vascular area to chorionic vascular perimeter ("ruffling") | −.47 | .34 | −.87 | .39 |
| Ratio of chorionic plate area to chorionic plate perimeter ("ruffling") | .69 | .80 | .86 | .39 |
| Chorionic plate radius from centroid standard deviation | .00 | .00 | .82 | .42 |
| Chorionic vascular radius from centroid standard deviation | 300 | .00 | .94 | .35 |
| Distance between chorionic vascular and chorionic plate centroids | .33 | .14 | 2.35 | .02 |
| Distance between inner and outer centroids, normalized for scaling | −5.67 | 2.23 | −2.54 | .01 |
| Distance from cord insertion point to outer centroid | .07 | .03 | 2.43 | .02 |
| Distance between cord insertion point and outer centroid, normalized for scaling | −1.08 | .45 | −2.37 | .02 |
| Chorionic plate area compactness | .34 | .25 | 1.39 | .17 |
| Chorionic vascular area compactness | −.01 | .16 | −.05 | .96 |

TABLE 12

Regression: Dependent- 0/E BW ratio, Ln transformed predictors

| Model |  | Unstandardized Coefficients | | t | Sig. |
|---|---|---|---|---|---|
|  |  | B | Std. Error |  |  |
| 1 | (Constant) | .464 | .059 | 7.807 | .000 |
|  | Inintercent | −.045 | .016 | −2.826 | .005 |
|  | Incordent | −.013 | .012 | −1.089 | .277 |
|  | o_e_pw | .341 | .033 | 10.181 | .000 |

Thus, variations in 0/E BW for a given placental weight can be explained, at least in part, by subtle alterations in the relationships among placental parameters (e.g., cord insertion, chorionic vessel growth and chorionic disk expansion). Asymmetric growth of chorionic vasculature relative to the underlying chorionic disk results in a relatively inefficient placenta that produces a smaller-than-expected infant.

Example 11

Placental Volume and Gestational Age Affects Birth-Weight

Gestational age plays a large role in accounting for the variability in birth-weight data. It can explain 50% of birth-weight variability. Calculations of placenta volume, in combination with birth-weight, will account for an additional 8% of variability in placenta volume. This is an indication that the three-dimensional shape of a placenta is an important factor in human health.

TABLE 13

R2 values for the three regression models

|  | R2 |
|---|---|
| Volume and gestational age interacting vs. birth-weight | 0.58 |
| Gestational age vs. birth-weight | 0.50 |

What is claimed is:

1. A method of analyzing the placenta comprising: selecting a placental sample to be analyzed; preparing a histology slide of tissue taken from said placental sample, staining the histology slide using an immunohistochemistry stain, obtaining a digital image of the stained slide; and performing an automated computer analysis on the digital image, wherein the number of trophoblast stromal inclusions is measured.

2. The method of claim 1 wherein said immunohistochemistry stain is selected from the group consisting of HPL (human placental lactogen), HSV (herpes simplex virus), ADENOVIRUS, ACTH (adenocorticotripic hormone), AFP (alpha fetoprotein), RECEPTOR (androgen receptor), ANNEXIN, CD10, CD117, CD123, CD138, CD15, CD163, CD1a, CD2, CD20, CD21, CD23, CD25, CD3, CD30, CD31, CD33, CD34, CD34BM, CD38, CD4, CD43, CD45RA, CD45RO, CD5, CD56, CD57, CD68, CD7, CD79a, CD8, CD99, CDX2, CK5/6, CK7, CK8, CK20, CMV, E-CADHERIN, EGFR (epithelium growth factor receptor), ERG, EMA, EMA-PERINEURIOMA, ER (estrogen receptor), FACTOR 8, FSH, GLUT1, hCG, IgG, CD61, CD14, ACTIN, MPO, c-Myc, P53, PLAP, PMS2, PD-1, SMA, TCR, TOXO, VIMENTIN, CKAE1/AE3, CKMIX, CKCAM5.2, and SALL4.

3. The method of claim 1 wherein said immunohistochemistry stain is selected from the group consisting of CK5/6, CK7, CK8, CK20, CKAE1/AE3, CKMIX, CKCAM5.2.

4. The method of claim 1 wherein the number of trophoblast stromal inclusion is used to assess future health risks of autism spectrum disorder.

5. The method of claim 1 wherein the automated computer analysis includes a segmentation step.

6. The method of claim 1 wherein the automated computer analysis includes an object based algorithm.

* * * * *